US011302133B2

(12) United States Patent
Aubrey et al.

(10) Patent No.: US 11,302,133 B2
(45) Date of Patent: Apr. 12, 2022

(54) SYSTEMS AND METHODS FOR HEALTH SCREENING AND ACCESS

(71) Applicant: STERLING READINESS ROUNDS, L.L.C., Eudora, KS (US)

(72) Inventors: Kimberlee Aubrey, De Soto, KS (US);
Donald Death, Scenectady, NY (US);
Dawn Foster, Eudora, KS (US);
LaShea Johnson, Lawrence, KS (US);
Darrel Lard, Amarillo, TX (US);
Melisa Lynn, De Soto, KS (US);
Jacque McClaskey, Eudora, KS (US);
Jay Muckenthaler, Ossining, NY (US);
Lindsey Norwood, Eudora, KS (US);
Micheal Thornton, Eudora, KS (US);
Eric Tweedy, Eudora, KS (US);
Luciana Prata, Waterford, NY (US);
Matthew Pinto, Schenectady, NY (US);
Nitin Kaushik, Eudora, KS (US);
Randy Merriman, Canyon, TX (US);
Chad McElwain, Merriam, KS (US)

(73) Assignee: STERLING READINESS ROUNDS, L.L.C., Eudora, KS (US)

( * ) Notice: Subject to any disclaimer, the term of this patent is extended or adjusted under 35 U.S.C. 154(b) by 0 days.

(21) Appl. No.: 17/328,238

(22) Filed: May 24, 2021

(65) Prior Publication Data
US 2021/0375084 A1 Dec. 2, 2021

Related U.S. Application Data

(60) Provisional application No. 63/031,716, filed on May 29, 2020.

(51) Int. Cl.
*G07C 9/28* (2020.01)
*G07C 9/22* (2020.01)
(Continued)

(52) U.S. Cl.
CPC ......... *G07C 9/28* (2020.01); *G06K 19/06009* (2013.01); *G06Q 50/265* (2013.01);
(Continued)

(58) Field of Classification Search
CPC ......... G06K 19/06009; G06K 9/00006; G06K 9/00288; G06K 9/00362; G06K 7/10297;
(Continued)

(56) References Cited

U.S. PATENT DOCUMENTS

| 2009/0040014 | A1* | 2/2009 | Knopf | E04G 21/32 340/5.1 |
|---|---|---|---|---|
| 2021/0106855 | A1* | 4/2021 | Al-Rasheed | A62B 35/0043 |
| 2021/0265843 | A1* | 8/2021 | Baldasare | H02J 7/0047 |

\* cited by examiner

*Primary Examiner* — Dionne Pendleton
(74) *Attorney, Agent, or Firm* — Hovey Williams LLP

(57) ABSTRACT

A system for health screening and access to a facility comprises a computer server and a plurality of stations. The computer server and/or each station are configured to: receive input from a touch screen indicating one of a plurality of entrant types, the input being initiated by an individual; receive identification information from a badge scanner; receive a temperature value from a temperature scanner; if the temperature value is above a normal threshold, send a notification to facility staff; if the temperature value is within a normal range, display wellness attestation questions and receive wellness attestation answers; if any wellness attestation answer is adverse, send the notification; if no wellness attestation answer is adverse, for employees, display a question inquiring if the employee needs an item of personal protective equipment (PPE) and receive a PPE answer, and for non-employees, print a label that includes identification information about the individual.

20 Claims, 19 Drawing Sheets

(51) Int. Cl.
  *G06K 19/06*   (2006.01)
  *G07C 9/21*    (2020.01)
  *G07C 9/27*    (2020.01)
  *G06Q 50/26*   (2012.01)
  *G07C 9/00*    (2020.01)

(52) U.S. Cl.
  CPC ..... *G07C 9/00563* (2013.01); *G07C 9/00896* (2013.01); *G07C 9/21* (2020.01); *G07C 9/22* (2020.01); *G07C 9/27* (2020.01)

(58) Field of Classification Search
  CPC ........... G06K 9/00214; G06K 9/00228; G06K 9/6201; G07C 9/21; G07C 9/22; G07C 9/27; G07C 9/28; G07C 9/00563; G07C 9/00896; G07C 9/00912; G07C 9/32; G08B 21/182; H02J 7/00034; H02J 7/0013; H02J 7/0044; H02J 7/0047; H02J 7/0048; H04L 63/0861; H04M 1/72409; H04W 12/06; H04W 12/065; H04W 4/021; H04W 4/023; H04W 4/80; H04W 8/18; A41D 13/11; A41D 13/1107; A41D 13/1176; A41D 13/1184; A41D 2300/30; A42B 3/00; A42B 3/326; A62B 18/00; A62B 18/025; A62B 18/04; A62B 18/086; A62B 23/025; G08C 17/02; G08C 17/04; G08C 2201/91; G06Q 50/265; H04N 13/20; E04G 21/32

See application file for complete search history.

Employee One (1804)

Your Temperature: 97.9°

Do You Have Any Of The Following Symptoms?

| Question | | |
|---|---|---|
| Cough, Congestion, Runny Nose or Shortness of Breath | No | Yes |
| Chills, New or Unusual fatigue? | No | Yes |
| New or Unusual Muscle or Body Aches? | No | Yes |
| Sore Throat, New Loss of Taste or Smell? | No | Yes |
| Nausea, Vomiting or Diarrhea? | No | Yes |
| Have you been exposed without the use of PPE to anyone with known or suspected COVID-19 in the last 14 days? | No | Yes |
| Have you been diagnosed with COVID-19 in the last 14 days? | No | Yes |
| In the past 14 days hae you traveled outside of the state? | No | Yes |

Start Over

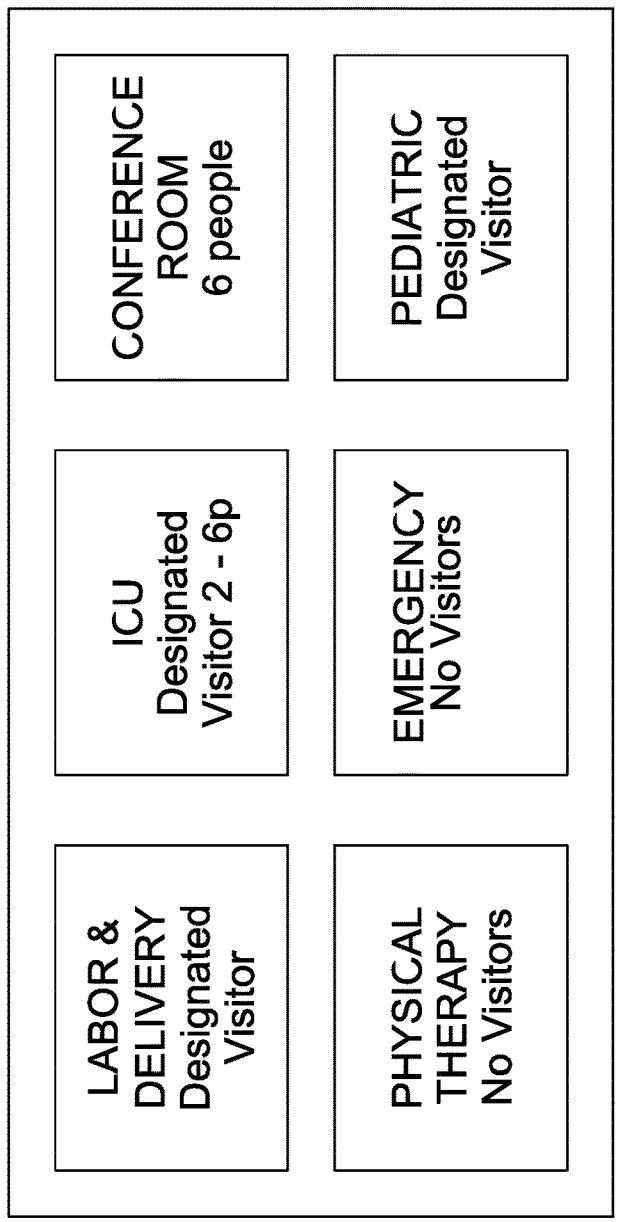

Fig. 13.

Supply Tracking

⊙ Main                  ⊙ Log Out

Department: ( Emergency Department » )  ( Daily Counts )  ( Scrub Tracking )

⊕ Excel Reports

Emergency Department

*Showing up to the last 10 records only*

| Delete | Product | Quantity | Checked Out |
|---|---|---|---|
| ⊗ | Face Shields | 3 | 04/20/20 12:38 PM |
| ⊗ | Wipes | 2 | 04/30/20 12:38 PM |

*Add Record*

Product          Quantity ( Wipes » )      ( 3 » )

( Check Out )

*Fig. 14.*

Scrub Tracking

Main | Log Out

Search Employee: 0123456 🔑    Add Employee    Daily Counts

Supply Tracking

⊕ Excel Reports

JANE DOE (0123456) - WPH Nursing 3F

*Showing up to the last 5 records only*

| Delete | Top | Bottom | Checked Out | Returned |
|--------|-----|--------|-------------|----------|
| ⊗ | M | M | 04/07/20/11:32 AM | Return |

Add Record

Scrub Top: M ▷      Scrub Bottom: M ▷      Check Out

*Fig. 15.*

SYSTEMS AND METHODS FOR HEALTH SCREENING AND ACCESS

RELATED APPLICATIONS

The current patent application is a divisional patent application which claims priority benefit, with regard to all common subject matter, to earlier-filed U.S. Provisional Application No. 63/031,716, titled "SYSTEMS AND METHODS FOR HEALTH SCREENING AND ACCESS TO HOSPITALS AND OTHER HEALTH PROVIDER BUILDINGS", filed May 29, 2020. The provisional application is hereby incorporated by reference in its entirety into the current patent application.

FIELD OF THE INVENTION

Embodiments of the current invention relate to systems and methods for health screening an individual before entry into a facility.

BACKGROUND

Traditionally, employees at a medical facility, such as a hospital, may have "clocked in" to start their work shift. Patients may have signed a log as part of checking in to the medical facility. Visitors and vendors may have entered and left freely. There was no accounting for who was present in the facility at any given time and, other than employees, virtually no way to contact those who were. No one was checked for symptoms that may be indicative of, or recent activities that may have exposed them to, a contagious illness.

SUMMARY OF THE INVENTION

Embodiments of the current invention address one or more of the above-mentioned problems and provide a distinct advance in the art of health screening an individual before entry into a facility. Specifically, embodiments of the current invention provide systems and methods that obtain identification of everyone who enters the facility and contact information of everyone other than employees. Embodiments of the current invention also check everyone's temperature, review the answers to screening questions, and notify facility staff if anyone has an elevated temperature or answers one of the screening questions adversely.

One embodiment of a system broadly comprises a computer server and a plurality of stations. The computer server includes a processing element. The stations are in electronic communication with each other and with the computer server through a communication network. Each station includes a touch screen, a badge scanner, a temperature scanner, a printer, and a computing device. The touch screen is configured to display information and receive input. The badge scanner is configured to scan identification information from an identification card of an individual wishing to gain access to the facility. The temperature scanner is configured to measure the body temperature of the individual. The computing device includes a processing element. The processing element of the computer server and/or the processing element of each computing device are programmed or configured to: receive input from the touch screen indicating one of a plurality of entrant types, the input being initiated by the individual; receive identification information from the badge scanner; receive a temperature value from the temperature scanner; if the temperature value is above a normal threshold, then send a notification to facility staff; if the temperature value is within a normal range, then display a plurality of wellness attestation questions on the touch screen and receive a plurality of wellness attestation answers; if any of the wellness attestation answers is adverse, then send the notification to facility staff; if no wellness attestation answer is adverse, then if the entrant type is employee, then display a question on the touch screen inquiring if the employee needs an item of personal protective equipment (PPE) and receive a PPE answer; and if the entrant type is not employee, then print a label that includes the identification information about the individual.

An embodiment of the method broadly comprises receiving input from a touch screen indicating one of a plurality of entrant types, the input being initiated by an individual wishing to gain access to the facility; receiving identification information from a badge scanner; receiving a temperature value from a temperature scanner; if the temperature value is above a normal threshold, then sending a notification to facility staff; if the temperature value is within a normal range, then displaying a plurality of wellness attestation questions on the touch screen and receiving a plurality of wellness attestation answers; if any of the wellness attestation answers is adverse, then sending the notification to facility staff; if no wellness attestation answer is adverse, then if the entrant type is employee, then displaying a question on the touch screen inquiring if the employee needs an item of personal protective equipment (PPE) and receiving a PPE answer; and if the entrant type is not employee, then printing a label that includes the identification information about the individual.

Another embodiment of the method broadly comprises receiving input from a touch screen indicating one of a plurality of entrant types, the input being initiated by an individual wishing to gain access to the facility; receiving identification information from a badge scanner; receiving a temperature value from a temperature scanner; if the temperature value is above a normal threshold, then sending a notification to facility staff; if the temperature value is within a normal range, then displaying a plurality of wellness attestation questions on the touch screen and receiving a plurality of wellness attestation answers; if any of the wellness attestation answers is adverse, then sending the notification to facility staff; if no wellness attestation answer is adverse, then if the entrant type is employee, then displaying a question on the touch screen inquiring if the employee needs an item of personal protective equipment (PPE) and receiving a PPE answer; if the PPE answer is yes, then displaying a query on the touch screen for a type of PPE needed, receiving the answer, and recording the type of PPE issued to the employee and a time of issue; if the PPE answer is no or if the employee received the PPE, then recording all data for the wellness attestation answers and the PPE answer associated with the identification information of the employee on the computer server; if the entrant type is patient, then displaying a query on the touch screen for a phone number for the patient, receiving the phone number, and associating it with identification information about the individual; displaying a query on the touch screen for a destination for a service for the patient and receiving destination information; printing the label that includes identification information about the individual and destination information; if the entrant type is visitor, then receiving a phone number for the visitor and associating it with identification information about the individual; receiving a patient room information which the visitor is to visit; printing the label that includes identification information about the individual, patient room information, and a quick response (QR) code; and if the entrant type is vendor, then displaying a query on the touch screen for a phone number for the vendor, receiving the phone number, and associating it with identification information about the individual.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the current invention are described in detail below with reference to the attached drawing figures, wherein.

Figure 6:
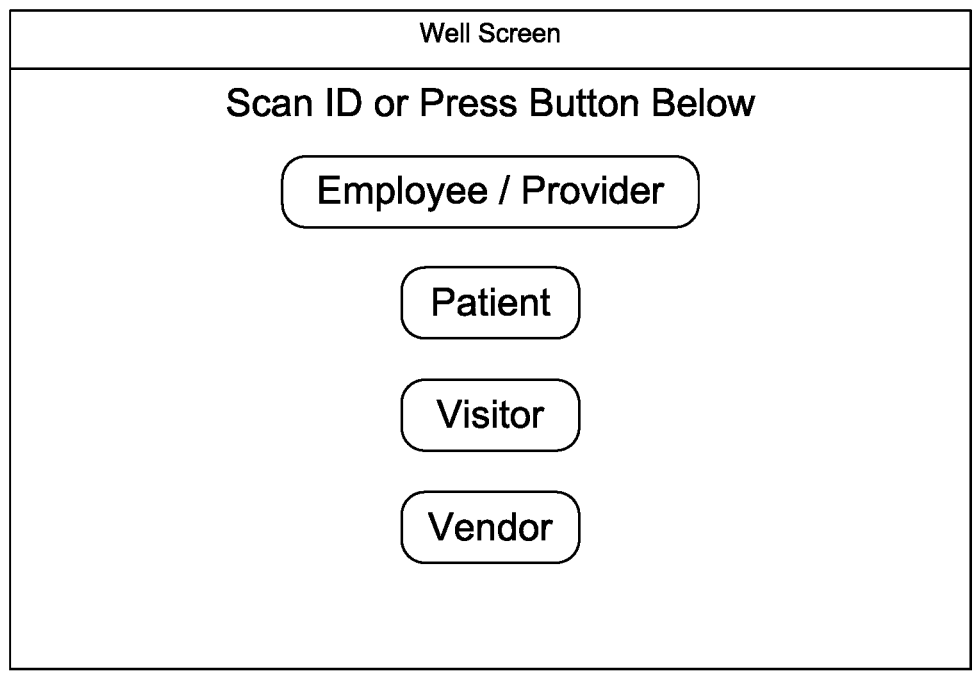

FIGS. 5A, 5B, 5C, 5D, 5E, 5F, 5G, and 5H each include a listing of at least a portion of the steps of a method for health screening and access to a facility;

FIG. 6 is a capture of a first computer screen illustrating a first aspect of the current invention;

FIG. 7 is a capture of a second computer screen illustrating a second aspect of the current invention;

Figure 8:
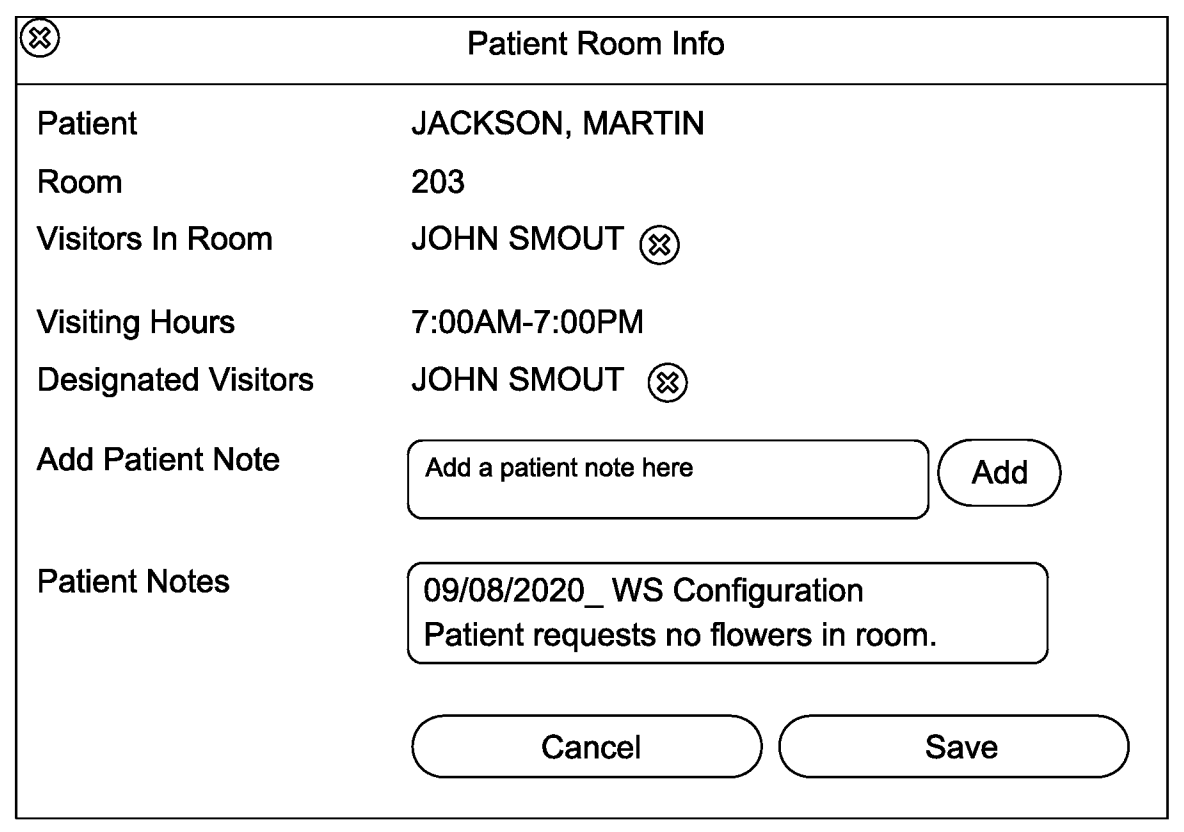

FIG. 8 is a capture of a third computer screen illustrating a third aspect of the current invention;

FIG. 9 is a capture of a fourth computer screen illustrating a fourth aspect of the current invention;

FIG. 10 is a capture of a fifth computer screen illustrating a fifth aspect of the current invention;

FIG. 11 is a capture of a sixth computer screen illustrating a sixth aspect of the current invention;

FIG. 12 is a capture of a seventh computer screen illustrating a seventh aspect of the current invention;

Figure 13:
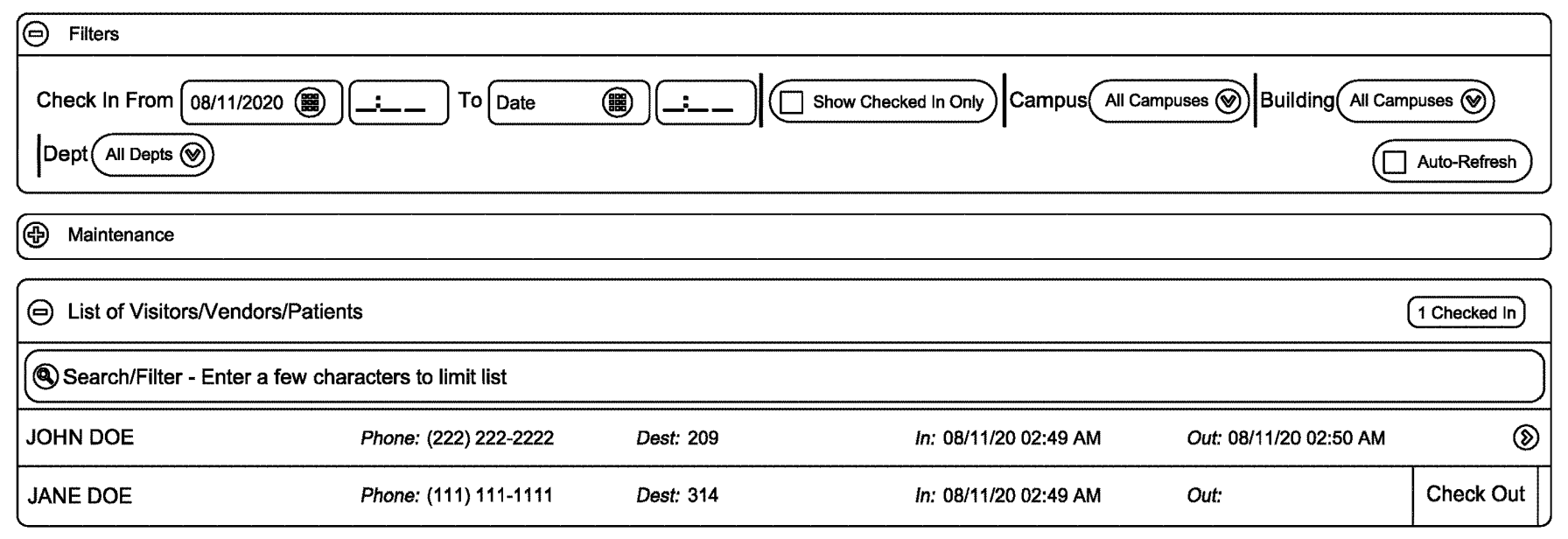

FIG. 13 is a capture of an eighth computer screen illustrating an eighth aspect of the current invention;

FIG. 14 is a capture of a ninth computer screen illustrating a ninth aspect of the current invention; and FIG. 15 is a capture of a tenth computer screen illustrating a tenth aspect of the current invention.

The drawing figures do not limit the current invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the technology references the accompanying drawings that illustrate specific embodiments in which the technology can be practiced. The embodiments are intended to describe aspects of the technology in sufficient detail to enable those skilled in the art to practice the technology. Other embodiments can be utilized and changes can be made without departing from the scope of the current invention. The following detailed description is, therefore, not to be taken in a limiting sense. The scope of the current invention is defined only by the appended claims, along with the full scope of equivalents to which such claims are entitled.

Figure 1:
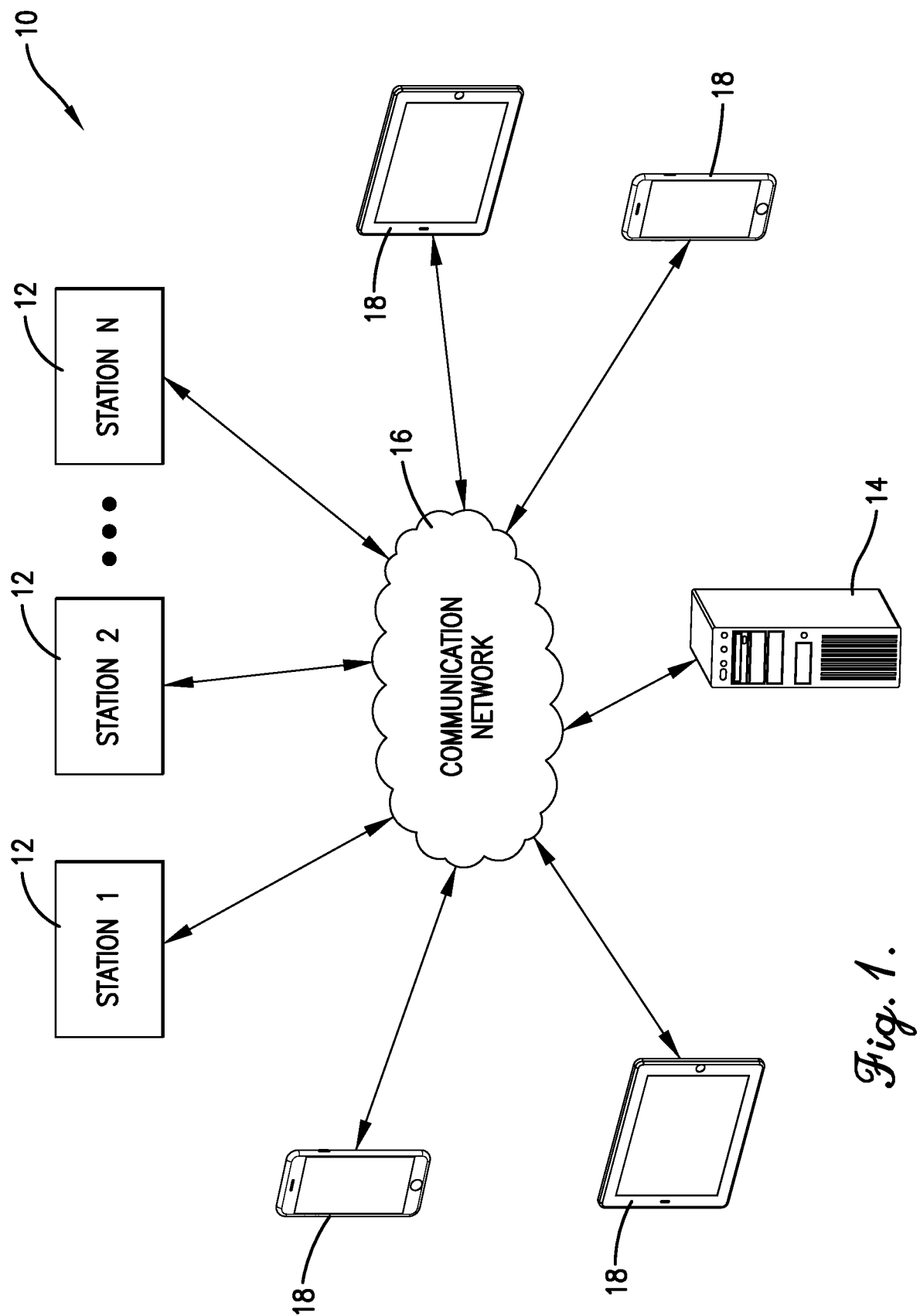
FIG. 1 is an environmental schematic diagram of a system, constructed in accordance with various embodiments of the current invention, for health screening and access to a facility, the system comprising a plurality of stations and a computer server, the system interacting with a communication network and a plurality of mobile electronic devices.

A system 10, constructed in accordance with various embodiments of the current invention, for health screening and access to a facility, such as a hospital, is shown in FIG. 1. Certain components of the system 10 may be placed or positioned near entry and exit points of a facility, such as a hospital or other building, to control entry to the facility and to monitor exiting of the facility. The system 10 is generally utilized by individuals such as medical staff, hospital or building employees, vendors, patients, visitors, and the like. Although embodiments of the current invention are described as being implemented with a hospital or health care provider buildings, the current invention can be utilized with any type of facility for nearly any industry. For example, the current invention may be utilized with a warehouse or storage facility, a manufacturing facility, a utility provider facility, or the like.

Referring to FIG. 1, the system 10 broadly comprises a plurality of stations 12 and a computer server 14. Components of the system 10 communicate with each other through a communication network 16. The system 10 also communicates with mobile electronic devices 18, such as smartphones, cell phones, tablets, and the like.

The communication network 16 may include the Internet, cellular communication networks, local area networks, metro area networks, wide area networks, cloud networks, telecommunication systems, plain old or public ordinary telephone service (POTS) networks, public switched telephone networks (PSTN), and the like, or combinations thereof. The communication network 16 may be wired, wireless, or combinations thereof and may include components such as modems, gateways, switches, routers, hubs, access points, repeaters, towers, and the like. The components of the system 10 may connect to the communication network 16 either through wires, such as electrical cables, utilizing protocols like ethernet, or fiber optic cables, or wirelessly, such as radio frequency (RF) communication using wireless standards such as cellular 2G, 3G, 4G, LTE, or 5G, Institute of Electrical and Electronics Engineers (IEEE) 802.11 standards such as WiFi, IEEE 802.16 standards such as WiMAX, Bluetooth™, or combinations thereof.

Figure 2:
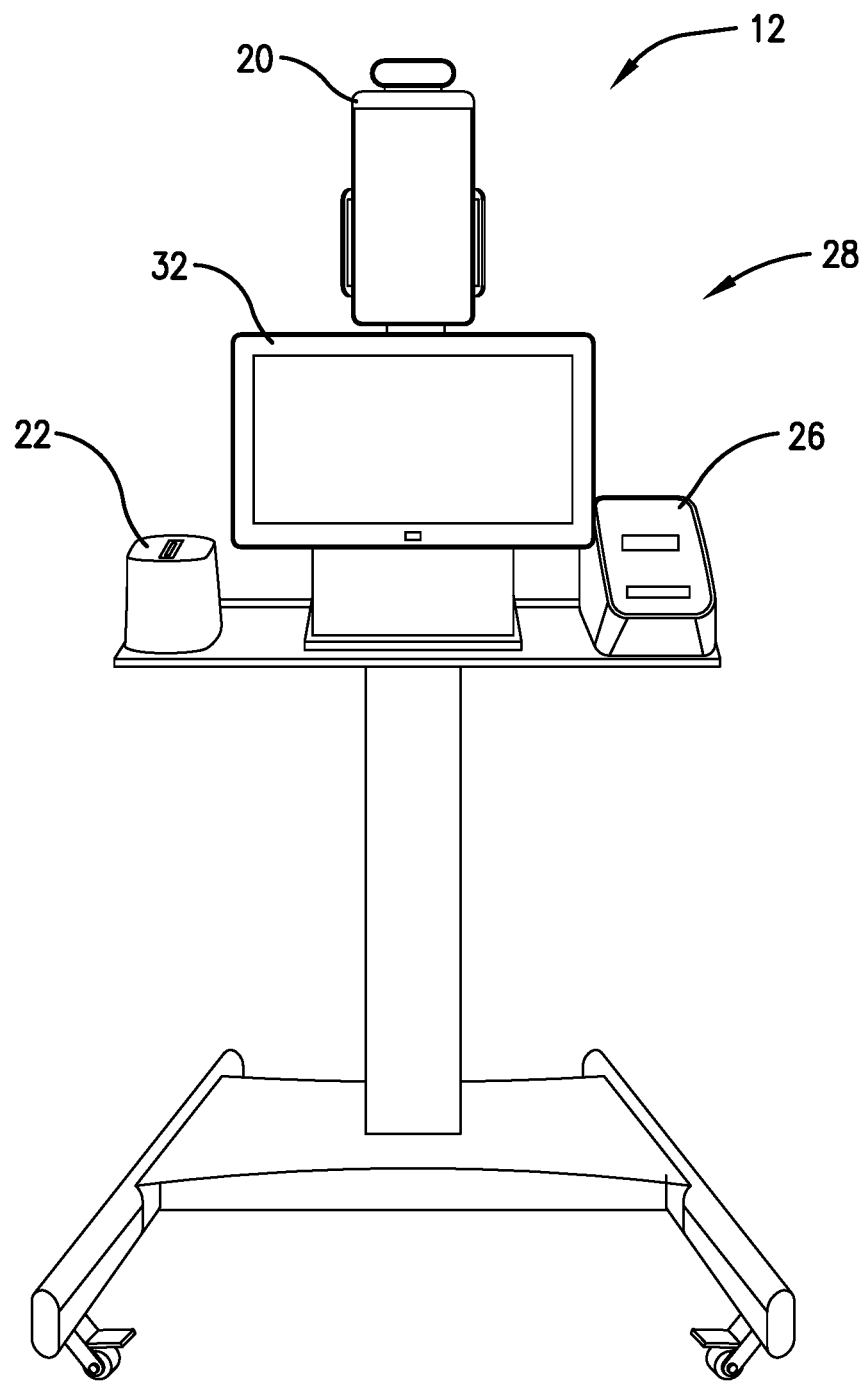
FIG. 2 is a front view of one of the stations including a temperature scanner, a badge scanner, a printer, and a computing device.

Referring to FIG. 2, each station 12 broadly comprises a temperature scanner 20, a badge scanner 22, a quick response (QR) scanner 24, a printer 26, and a computing device 28. Communication between these components is illustrated schematically in FIG. 3. The station 12, or various components of the station 12, may be placed on a mobile or stationary stand as shown in FIG. 2. Alternatively, the station 12, or various components of the station 12, may be placed on a desktop, a table top, or a countertop, or the like.

In some implementations of the system 10, the stations 12 may be configured to interface primarily with certain types of individuals. For example, one or more stations 12 may be intended to be utilized primarily by facility staff, one or more stations 12 may be intended to be utilized primarily by patients, one or more stations 12 may be intended to be utilized primarily by visitors or vendors, and so forth. In addition, some stations 12 may be operated by a facility staff attendant who enters information on behalf of individuals wishing to access the facility.

The temperature scanner 20 generally measures a body temperature of the individuals wishing to gain access to the facility. The temperature scanner 20 includes a thermal sensor, such as an infrared radiation sensor, that receives an image of the individual through imaging optics. The temperature scanner further includes electronic circuitry or a signal processor configured to determine the body temperature of the individual based on, or varying according to, the output of the thermal sensor. The temperature scanner 20 may also include a visible light or video camera which is configured to capture a visible spectrum image or moving video of the individual. In addition, the temperature scanner 20 includes a display 30 which displays the captured image or video of the individual along with the body temperature of the individual. The temperature scanner 20 outputs the body temperature as an electronic signal or digital data whose level or value varies according to the body temperature.

The badge scanner 22 generally reads electronic signals or digital data from a badge of an employee. The badge scanner 22 may include a slot into which the badge is inserted and a magnetic strip, an electronic chip, or an optical code, such as a bar code or QR code, on the badge is read. From the magnetic strip, electronic chip, or optical code, information about the employee is received by the badge scanner 22. The badge scanner 22 outputs the employee information as an electronic signal or digital data whose level or value varies according to the information.

The QR scanner 24 generally reads a QR code from a visitor badge or other object. The QR scanner 24 may include a port that has an optical transmitter which transmits a beam of light to the QR code area of the visitor badge and an optical receiver which receives a reflection of the beam of light from the QR code area. Additionally, or alternatively, the port may include a still image or video camera or sensor that receives an image of the QR code area of the visitor badge. The visitor badge is placed or held in front of the port in order for the QR scanner 24 to receive information from the QR code. The QR scanner 24 outputs the visitor information as an electronic signal or digital data whose level or value varies according to the information.

The printer 26 generally prints a label for a visitor to display in order to gain access to the facility. The printer 26 includes components that are configured to print labels on paper, cards, stickers, or other materials. The label that is printed by the printer 26 may include a photograph of the visitor, a name or other identification, a QR code with encoded visitor information, and so forth. The printer 26 receives information that is to be printed from the computing device 28.

Figure 3:
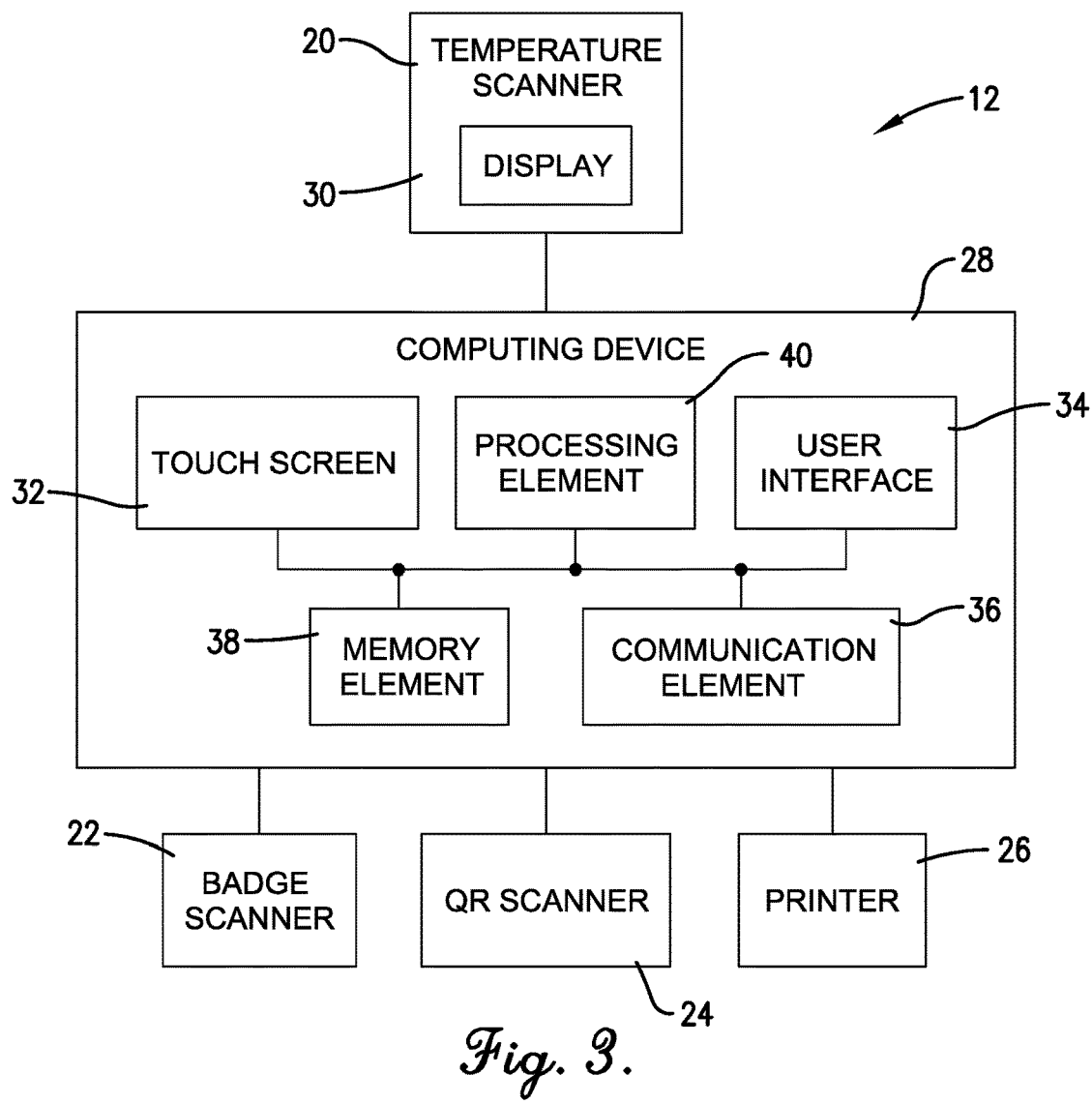
FIG. 3 is a schematic block diagram of various components of one of the stations.
Figure 4:
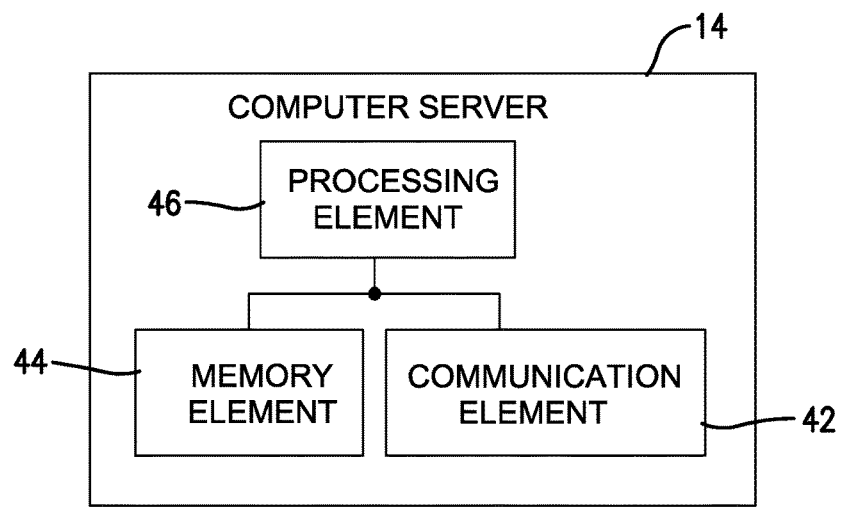
FIG. 4 is a schematic block diagram of various components of the computer server.
Figure 5A:
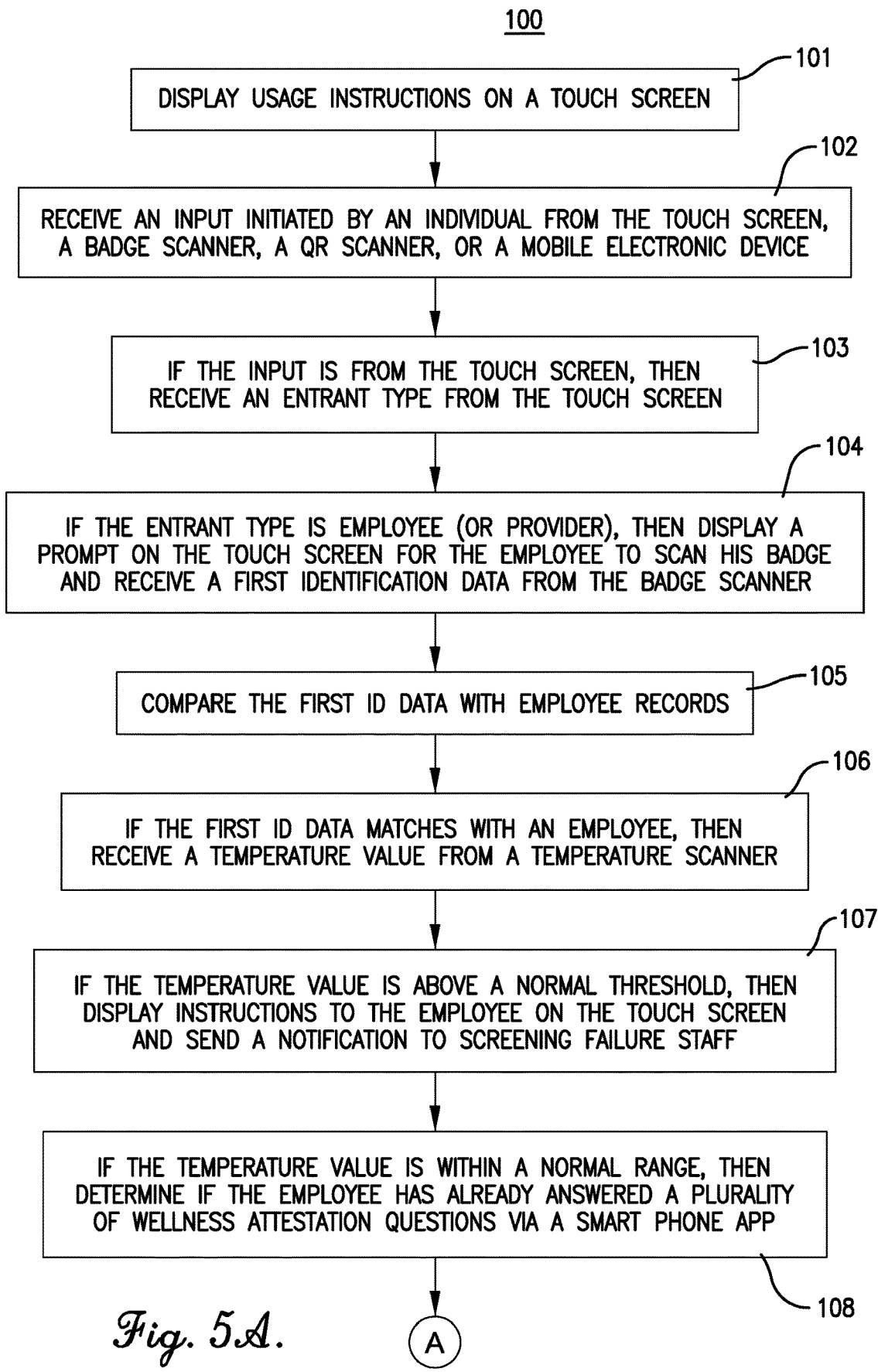
Figure 5B:
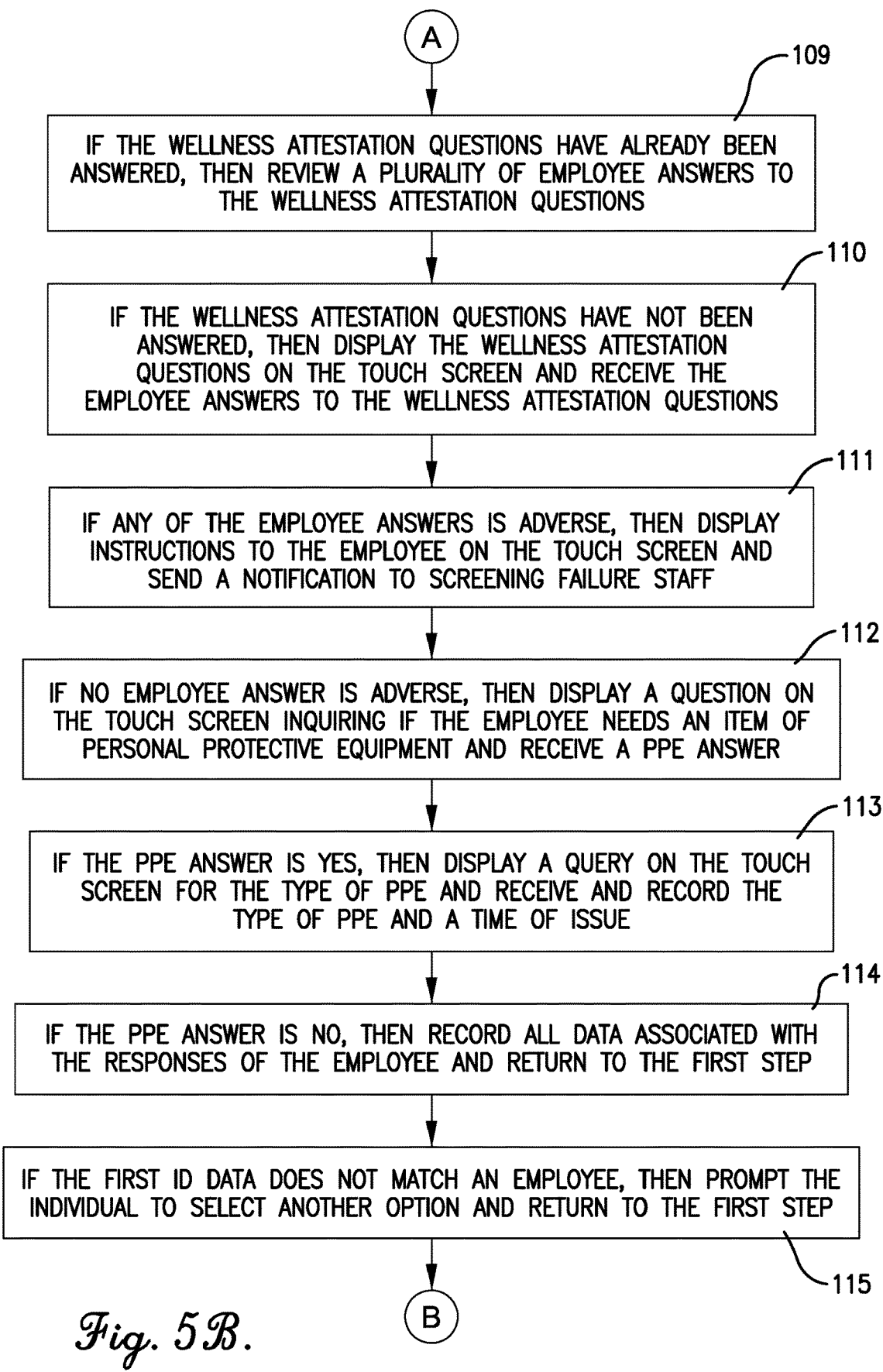
Figure 5C:
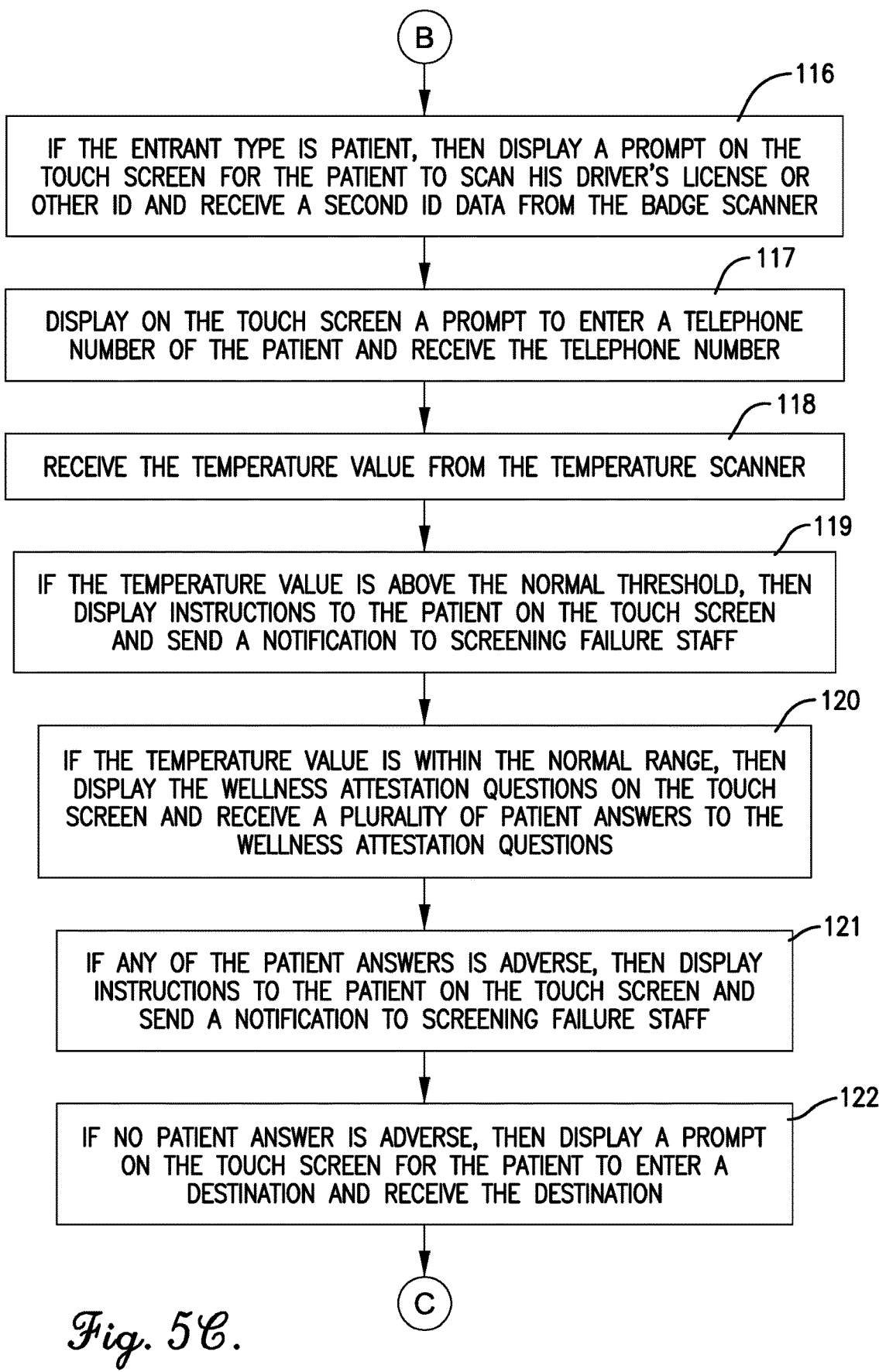
Figure 5D:
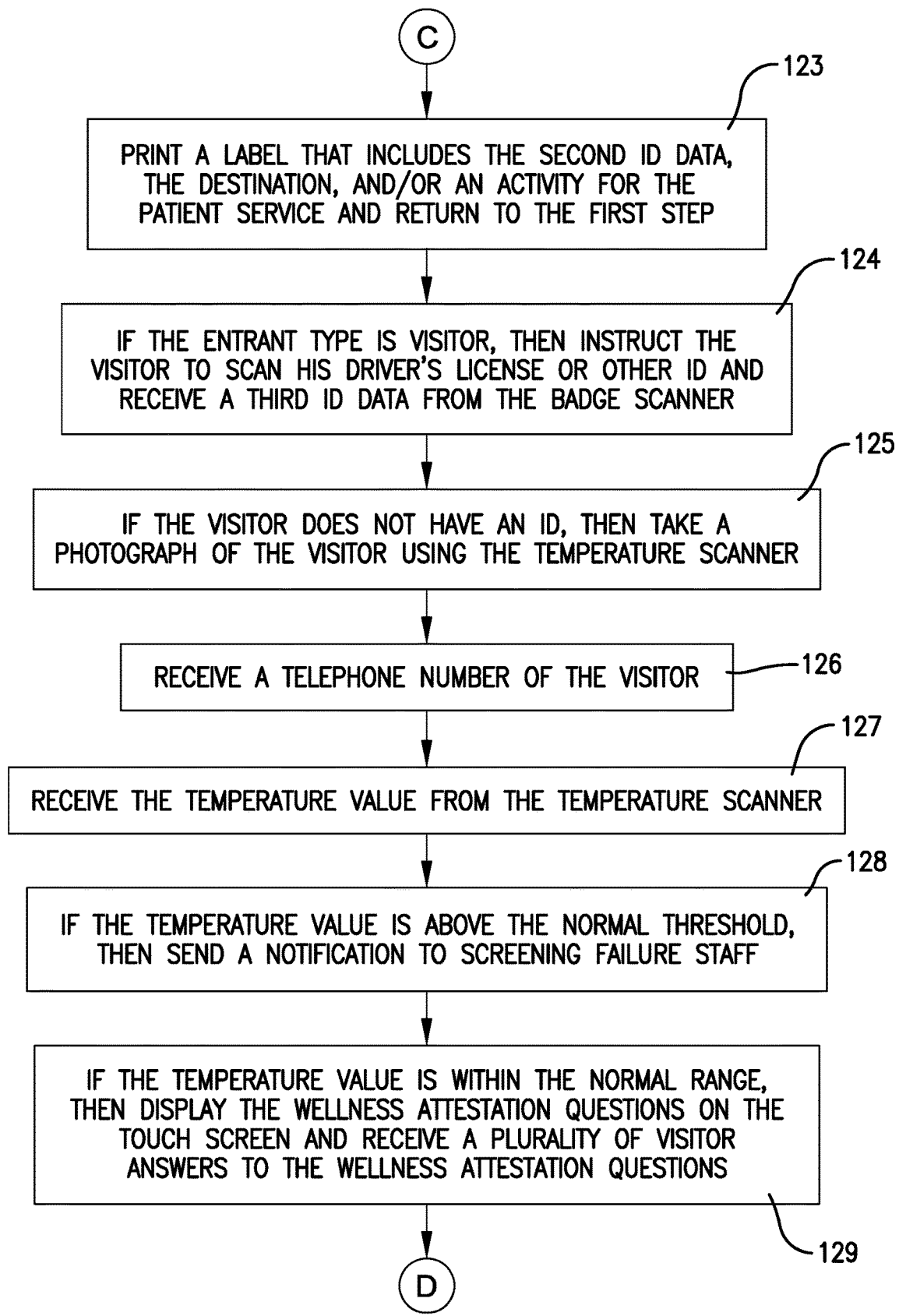
Figure 5E:
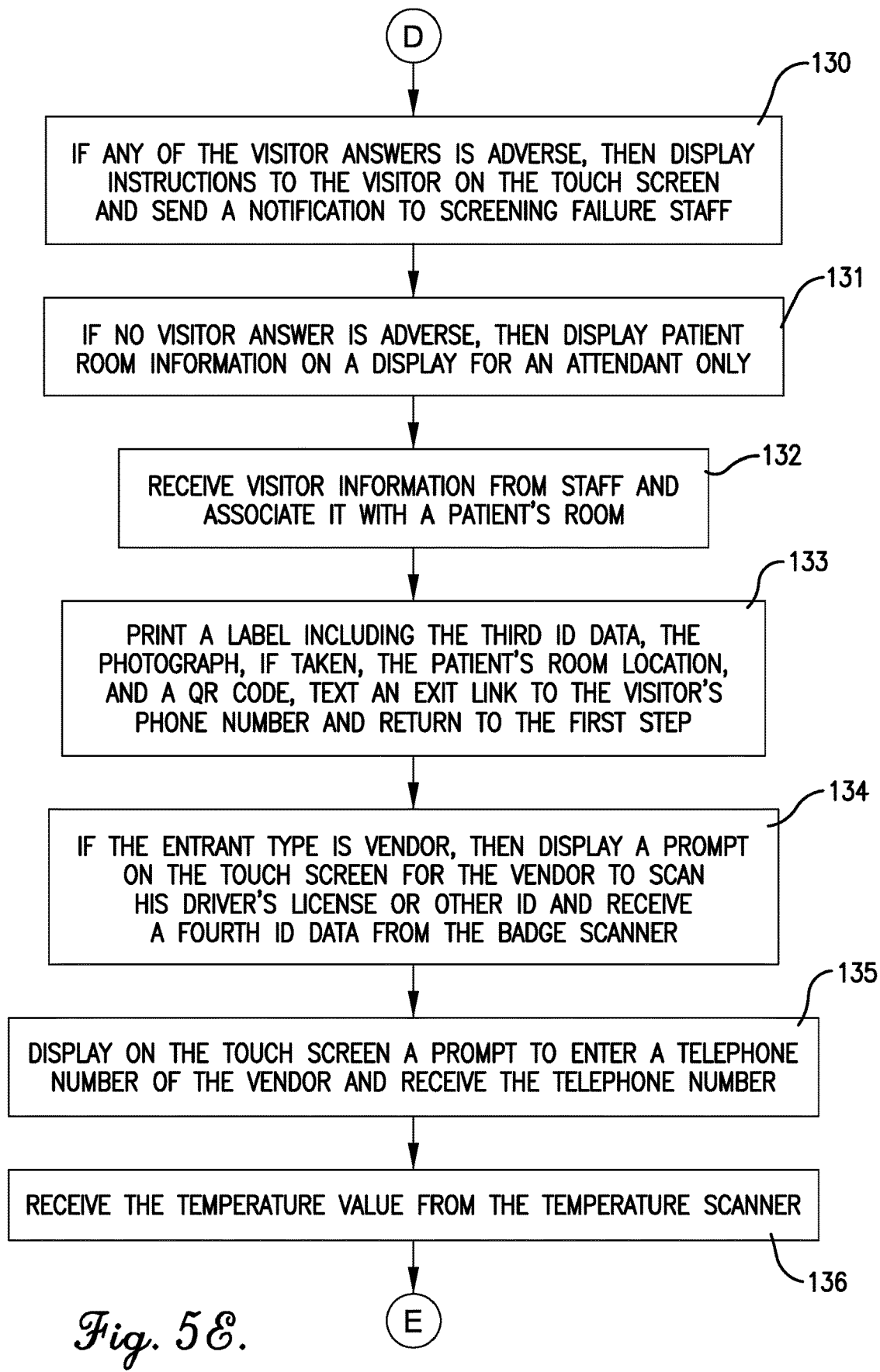
Figure 5F:
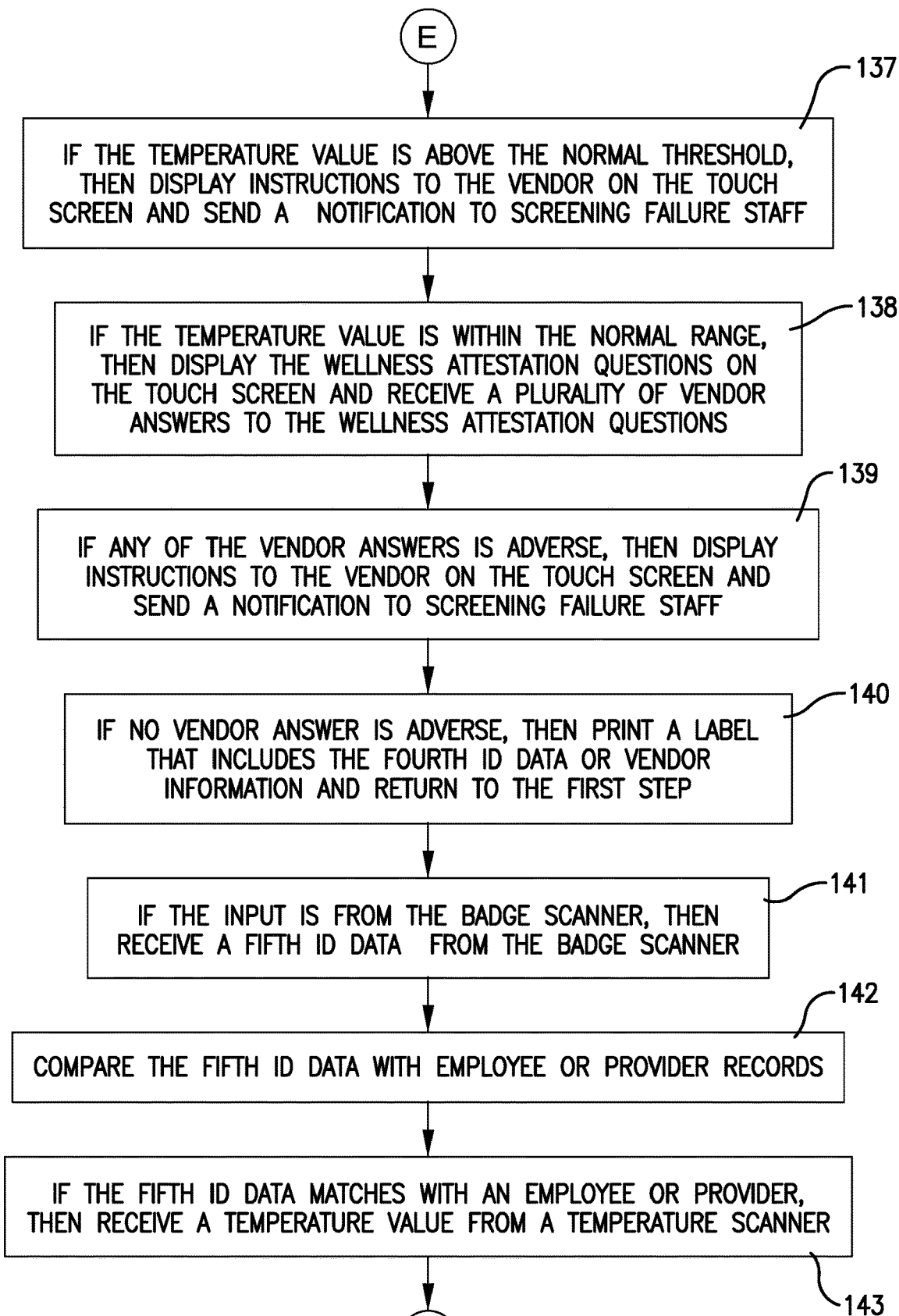
Figure 5G:
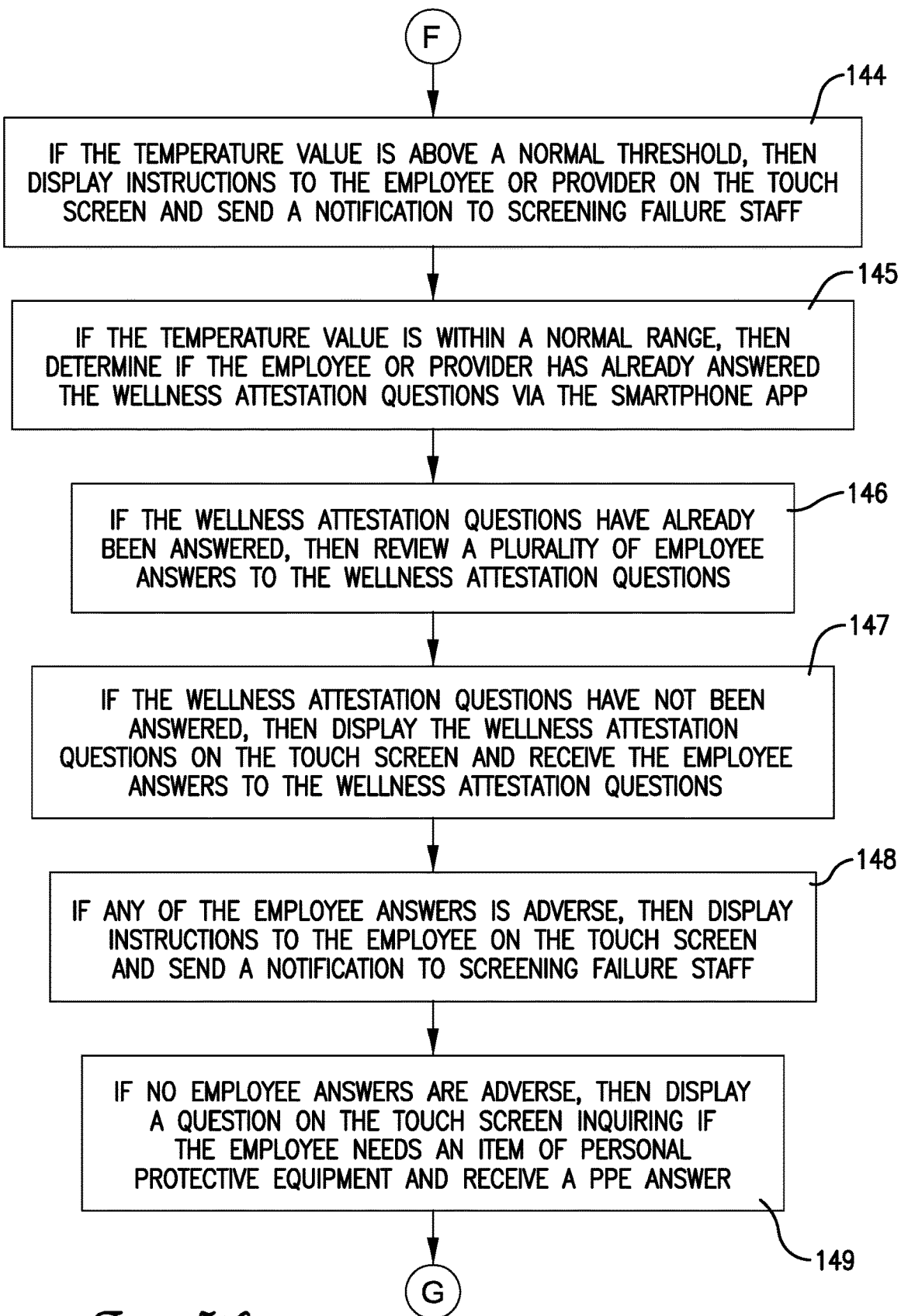
Figure 5H:
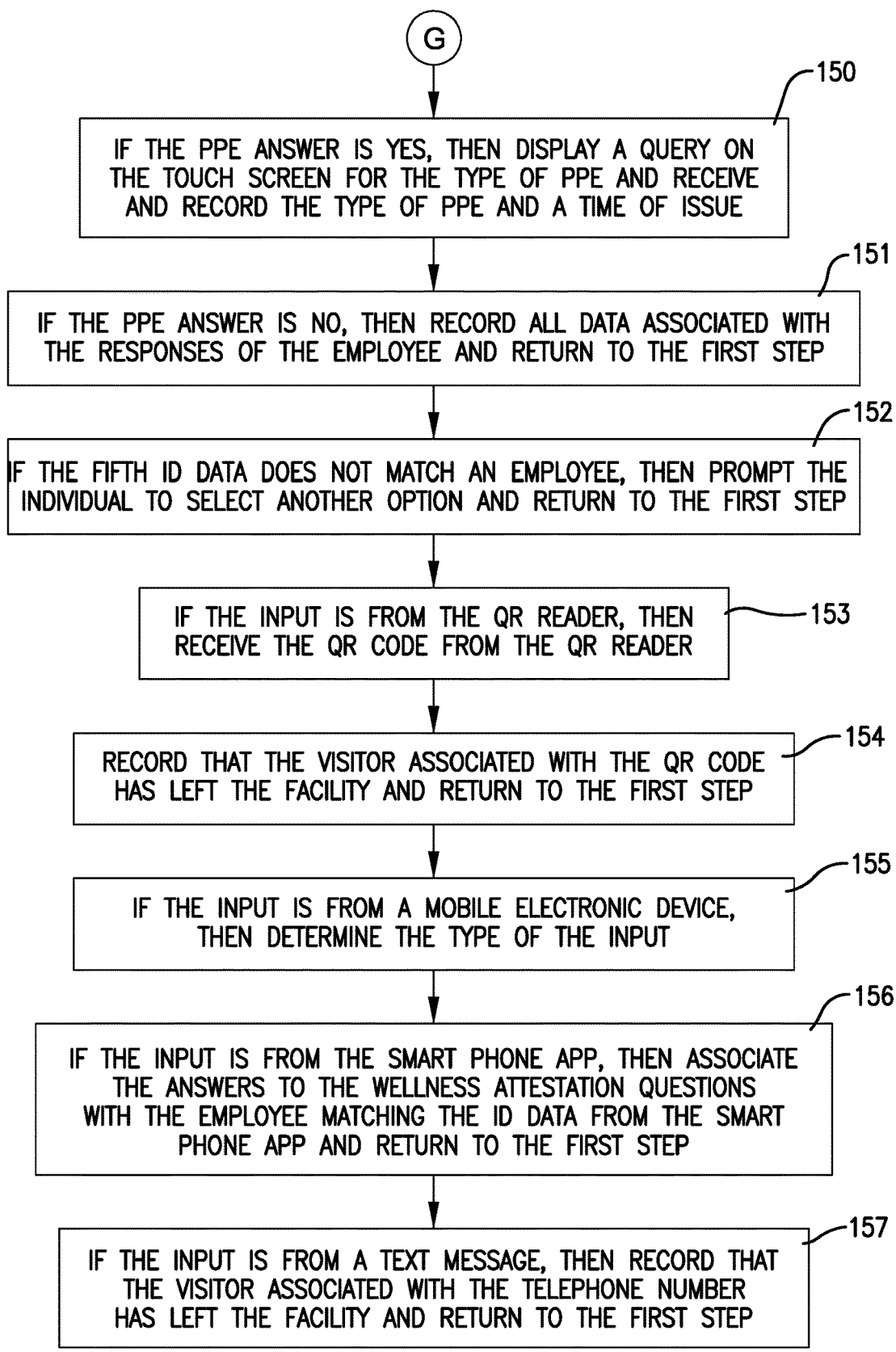

The computing device 28 generally controls a majority of the interaction of the individuals with the system 10. The computing device 28 may include, or may be embodied by, a server, a workstation computer, a desktop computer, a laptop computer, a notebook computer, a tablet or a tablet computer, or the like. As shown in FIG. 3, the computing device 28 includes a touch screen 32, a user interface 34, a communication element 36, a memory element 38, and a processing element 40.

The touch screen 32 generally presents information to an individual and allows the individual to interact with the computing device 28. The touch screen 32 may be integrated with displays or video devices of the following types: light-emitting diode (LED), organic LED (OLED), Light Emitting Polymer (LEP) or Polymer LED (PLED), liquid crystal display (LCD), thin film transistor (TFT) LCD, LED side-lit or back-lit LCD, or the like, or combinations thereof. The touch screen 32 may possess any one of a variety of shapes, such as a square or a rectangular aspect ratio that may be viewed in either a landscape or a portrait mode. The touch screen 32 allows the individual to interact with the computing device 28 by physically touching, swiping, or gesturing on areas of the screen 32 either with his fingers or with an object such as a stylus, a card, a badge, or other rigid object. The touch screen 32 may be in electronic communication with the memory element 38 and the processing element 40 and may receive data or information therefrom that is to be shown on the touch screen 32. The touch screen 32 may also output data or information to the memory element 38 and/or the processing element 40.

In various embodiments, the touch screen 32 may also include one or more cameras configured to take still or moving images of an individual.

The user interface 34 generally allows an individual, such as a visitor, an employee, an attendant, etc., to utilize inputs to interact with the computing device 28. Inputs may include keypads, keyboards, mice, or the like, or combinations thereof. In some embodiments, the user interface 34 additionally, or alternatively, includes the touch screen 32. With the user interface 34, the user is able to input data or information manually.

The communication element 36 generally allows the computing device 28 to communicate with other computing devices, external systems, networks, and the like. The communication element 36 may include signal and/or data transmitting and receiving circuits, such as antennas, amplifiers, filters, mixers, oscillators, digital signal processors (DSPs), and the like. The communication element 36 may establish communication wirelessly by utilizing radio frequency (RF) signals and/or data that comply with communication standards such as cellular 2G, 3G, 4G, Voice over Internet Protocol (VoIP), LTE, Voice over LTE (VoLTE), or 5G, Institute of Electrical and Electronics Engineers (IEEE) 802.11 standard such as WiFi, IEEE 802.16 standard such as WiMAX, Bluetooth™, or combinations thereof. Alternatively, or in addition, the communication element 36 may establish communication through connectors or couplers that receive metal conductor wires or cables which are compatible with networking technologies such as ethernet. In certain embodiments, the communication element 36 may also couple with optical fiber cables. The communication element 36 may be in electronic communication with the memory element 38 and the processing element 40.

The memory element 38 may be embodied by devices or components that store data in general, and digital or binary data in particular, and may include exemplary electronic hardware data storage devices or components such as read-only memory (ROM), programmable ROM, erasable programmable ROM, random-access memory (RAM) such as static RAM (SRAM) or dynamic RAM (DRAM), cache memory, hard disks, floppy disks, optical disks, flash memory, thumb drives, universal serial bus (USB) drives, solid state memory, or the like, or combinations thereof. In some embodiments, the memory element 38 may be embedded in, or packaged in the same package as, the processing element 40. The memory element 38 may include, or may constitute, a non-transitory "computer-readable medium". The memory element 38 may store the instructions, code, code statements, code segments, software, firmware, programs, applications, apps, services, daemons, or the like that are executed by the processing element 40. The memory element 38 may also store data that is received by the processing element 40 or the device in which the processing element 40 is implemented. The processing element 40 may further store data or intermediate results generated during processing, calculations, and/or computations as well as data or final results after processing, calculations, and/or computations. In addition, the memory element 38 may store settings, text data, documents from word processing software, spreadsheet software and other software applications, sampled audio sound files, photograph or other image data, movie data, databases, and the like.

The processing element 40 may comprise one or more processors. The processing element 40 may include electronic hardware components such as microprocessors (single-core or multi-core), microcontrollers, digital signal processors (DSPs), field-programmable gate arrays (FPGAs), analog and/or digital application-specific integrated circuits (ASICs), or the like, or combinations thereof. The processing element 40 may generally execute, process, or run instructions, code, code segments, code statements, software, firmware, programs, applications, apps, processes, services, daemons, or the like. The processing element 40 may also include hardware components such as registers, finite-state machines, sequential and combinational logic, configurable logic blocks, and other electronic circuits that can perform the functions necessary for the operation of the current invention. In certain embodiments, the processing element 40 may include multiple computational components and functional blocks that are packaged separately but function as a single unit. In some embodiments, the processing element 40 may further include multiprocessor architectures, parallel processor architectures, processor clusters, and the like, which provide high performance computing. The processing element 40 may be in electronic communication with the other electronic components of the computing device 28 through serial or parallel links that include universal busses, address busses, data busses, control lines, and the like. The processing element 40 may be operable, configured, or programmed to perform at least a portion of the functions, operations, and method steps discussed below by utilizing hardware, software, firmware, or combinations thereof.

The computer server 14 generally stores data and interfaces with mobile electronic devices 18 and externals systems. Although the figures show a single computer server 14 device, the computer server 14 may be embodied by a plurality of servers, virtual servers, or combinations thereof. The computer server 14 broadly comprises a communication element 42, a memory element 44, and a processing element 46. The communication element 42 and the memory element 44 may be the same, or similar to, the communication element 36 and the memory element 38, respectively, in structure and function. The processing element 46 may be similar in structure to the processing element 40. The processing element 46 may be operable, configured, or programmed to perform at least a portion of the functions, operations, and method steps discussed below by utilizing hardware, software, firmware, or combinations thereof.

FIGS. 5A-5H depicts a listing of at least a portion of the steps of an exemplary method 100 for health screening and access to hospitals and other health provider buildings. The steps may be performed in the order shown in FIGS. 5A-5H, or they may be performed in a different order. Furthermore, some steps may be performed concurrently as opposed to sequentially. In addition, some steps may be optional or may not be performed. The steps may be performed by the processing element 40 of the computing device 28 and/or the processing element 46 of the computer server 14. The data that is processed in the method 100 may be transmitted to and/or received from the temperature scanner 20, the badge scanner 22, the QR scanner 24, the printer 26, the mobile electronic devices 18, or external systems.

Referring to step 101, usage instructions are displayed on the touch screen 32. The usage instructions may be displayed on the touch screen 32 of each station 12 that is included in the system 10. In some embodiments, an individual wishing to enter a medical facility may approach any of the stations 12 to begin. In other embodiments, visitors may be directed by signage to particular stations 12 where an attendant is working. An example of the usage instructions is shown in FIG. 6, wherein the individual is instructed to scan his identification (ID), if he is an employee or a healthcare provider, or to select one of the options listed, including "employee/provider", "patient", "visitor", or "vendor", with each option being a label on a virtual button displayed on the touch screen 32. Selecting one of the listed options involves touching or contacting, with an object such as a pen or stylus, one of the virtual buttons. The touch screen 32 may display additional instructions or information not shown in the figures.

Referring to step 102, an input that is initiated by the individual is received from the touch screen 32, the badge scanner 22, the QR scanner 24, or the mobile electronic device 18. That is, the individual may contact the touch screen 32, insert a badge or other ID card into the badge scanner 22, or place a QR code in front of the QR scanner 24. In addition, the individual may interact with the system 10 through a smartphone app or text messaging.

Referring to step 103, if the input is from the touch screen 32, then an entrant type is received from the touch screen 32. The entrant type is one of the four choices that are displayed on the touch screen 32—employee, patient, visitor, or vendor.

Referring to step 104, if the entrant type is employee, then a prompt is displayed on the touch screen for the employee to scan his badge and a first ID data is received from the badge scanner 22. The first ID data may include a name of the employee, an employee number or code, a title, a department for which the employee works, a location in which the employee works, and the like.

Referring to step 105, the first ID data is compared with employee records. The employee records may be stored in the memory element 44 of the computer server 14. The employee records may be downloaded from databases on computer servers kept by the medical facility which is implementing and operating the system 10. The download of employee records and/or data from the medical facility to the computer server 14 may occur on a periodic basis, such as daily or weekly. Alternatively, or additionally, the employee records may be accessed directly by the computer server 14 or by the computing device 28, wherein the computer server 14 or the computing device 28 directly queries the databases of the medical facility to determine whether the first ID data matches any of the employees of the medical facility.

Referring to step 106, if the first ID data matches with an employee, then a temperature value from the temperature scanner 20 is received. The temperature scanner 20 outputs the temperature value and may display the temperature value on its display 30 along with an image, either moving or still, of the individual.

Referring to step 107, if the temperature value is above a normal threshold, then instructions to the employee are displayed on the touch screen 32 and a notification send to screening failure staff. Also, if the temperature value is above the normal threshold, then the temperature value may be shown on the display 30 with a warning indication, such as being shown in the color red and/or flashing. The instructions may tell the employee to exit the facility or to proceed to an additional screening room or other isolated area. Either the temperature value or an alert is sent from the computing device 28 to the computer server 14, which receives the temperature value or the alert and transmits a notification, such as a text message or an email, which is received by the mobile electronic devices 18 of screening failure staff, including doctors, nurses, technicians, security personnel, etc. The screening failure staff may proceed to the additional screening room or may meet the employee outside of the facility and may enact a protocol, such as performing additional screening checks, like retaking the employee's temperature. Alternatively, the employee may be allowed to wait for a period of time during which his temperature may decrease and then rescreen himself by repeating steps 104-107.

Referring to step 108, if the temperature value is within a normal range, then the computing device 28 may determine if the employee has already answered a plurality of wellness attestation questions via a smartphone app. Referring to FIG. 7, the wellness attestation questions may include enquiries about symptoms that the employee may be experiencing, such as respiratory or breathing problems; chills or fatigue; muscle or body aches; sore throat or loss of taste or smell; nausea, vomiting, or diarrhea; and the like. The wellness attestation questions may further include enquiries about the employee's exposure to other individuals diagnosed to have, or suspected to have, communicable diseases or viruses, such as COVID-19; about the employee being diagnosed himself with a communicable disease or virus, such as COVID-19; and about the employee having traveled outside of, or inside of, a certain region. Referring to FIG. 8, the wellness attestation questions may also include a verification for employees that the employee has been cleared to return to work if he previously had tested positive for any virus or illness of concern for which he had stopped working. Referring to FIG. 9, the wellness attestation questions may further include enquiry about travel to specific states, regions, or countries to which travel has been restricted. The listing of specific states, regions, or countries may vary over time and location of implementation of the system 10.

The employee may download and run a smartphone app that includes the wellness attestation questions so that the employee may answer the questions on their own mobile electronic device 18. The smartphone app then transmits the employee answers along with identification data associated with the employee to the computer server 14. Thus, the computing device 28 may check with the computer server 14 to determine whether the employee has already answered the wellness attestation questions.

Referring to step 109, if the wellness attestation questions have already been answered, then employee answers to the wellness attestation questions are reviewed. The computer server 14 may review the employee answers, or the computer server 14 may transmit the employee answers to the computing device 28 to review them.

Referring to step 110, if the wellness attestation questions have not been answered by the employee through the smartphone app, then the wellness attestation questions are displayed on the touch screen 32 and the employee answers to the wellness attestation questions are received. The wellness attestation questions are the same as discussed in step 108. The employee may answer the questions by touching or contacting the touch screen 32. The employee answers are received from the touch screen 32.

Referring to step 111, if any of the employee answers is adverse, then instructions to the employee are displayed on the touch screen 32 and a notification to screening failure staff is sent. The wellness attestation questions are typically yes/no questions which are formed such that an answer of "yes" to any of the questions indicates having symptoms or having been exposed to a disease or virus and is adverse. The computing device 28 reviews the employee answers and determines if any answer is adverse. Alternatively, the computing device 28 receives an indication from the computer server 14 as to whether any employee answer is adverse. The instructions may tell the employee to exit the facility or to proceed to an additional screening room or other isolated area. An alert is sent from the computing device 28 to the computer server 14, which receives the alert and transmits a notification, such as a text message or an email, which is received by the mobile electronic devices 18 of screening failure staff, including doctors, nurses, technicians, security personnel, etc. The screening failure staff may proceed to the additional screening room or may meet the employee outside of the facility and may enact a protocol.

Referring to step 112, if no employee answer is adverse, then a question is displayed on the touch screen 32 inquiring if the employee needs an item of personal protective equipment (PPE) and a PPE answer is received. The PPE may include a mask (surgical or N95), a gown, gloves, and the like.

Referring to step 113, if the PPE answer is yes, then display a query on the touch screen for the type of PPE needed and receive the answer and record the type of PPE issued to the employee and a time of issue.

Referring to step 114, if the PPE answer is no or if the employee received the PPE, then all data associated with the responses of the employee is recorded on the computer server 14 and the method 100 returns to step 101.

Referring to step 115, if the first ID data does not match an employee, then a prompt is displayed on the touch screen 32 for the individual to select another option, and the method 100 returns to the step 101.

Referring to step 116, if the entrant type is patient, then a prompt is displayed on the touch screen 32 for the patient to scan his driver's license or other ID and a second ID data is received from the badge scanner 22.

Referring to step 117, a prompt is displayed on the touch screen 32 to enter a telephone number of the patient and the telephone number is received from the touch screen 32. The telephone number of the patient may be used if contact tracing is necessary.

Referring to step 118, the temperature value from the temperature scanner 20 is received. The temperature scanner 20 outputs the temperature value and may display the temperature value on its display 30 along with an image, either moving or still, of the individual.

Referring to step 119, if the temperature value is above the normal threshold, then instructions to the patient are displayed on the touch screen 32 and a notification send to screening failure staff. Also, if the temperature value is above the normal threshold, then the temperature value may be shown on the display 30 with a warning indication, such as being shown in the color red and/or flashing. The instructions may tell the patient to exit the facility or to proceed to an additional screening room or other isolated area. Either the temperature value or an alert is sent from the computing device 28 to the computer server 14, which receives the temperature value or the alert and transmits a notification which is received by the mobile electronic devices 18 of screening failure staff. The screening failure staff may proceed to the additional screening room or may meet the patient outside of the facility and may enact a protocol, such as performing additional screening checks, like retaking the patient's temperature.

Referring to step 120, if the temperature value is within a normal range, then the wellness attestation questions are displayed on the touch screen 32 and the patient answers to the wellness attestation questions are received. The patient may answer the questions by touching or contacting the touch screen 32. The patient answers are received from the touch screen 32.

Referring to step 121, if any of the patient answers is adverse, then instructions to the patient are displayed on the touch screen 32 and a notification to screening failure staff is sent. The instructions may tell the patient to exit the facility or to proceed to an additional screening room or other isolated area. An alert is sent from the computing device 28 to the computer server 14, which receives the alert and transmits a notification, such as a text message or an email, which is received by the mobile electronic devices 18 of screening failure staff, including doctors, nurses, technicians, security personnel, etc. The screening failure staff may proceed to the additional screening room or may meet the patient outside of the facility and may enact a protocol.

Referring to step 122, if no patient answer is adverse, then a prompt is displayed on the touch screen 32 for the patient to enter a destination and the destination is received from the touch screen 32. The destination is a location within the medical facility where the patient will receive service or treatment.

Referring to step 123, a label is printed that includes the second ID data, the destination, and/or an activity for the patient service and the method 100 returns to step 101.

Referring to step 124, if the entrant type is visitor, then a message is displayed on the touch screen 32 directing the visitor to a station 12 with an attendant to complete the screening process. Alternatively, or additionally, signage in the facility entrance area may direct the visitor to an attended station 12. The attended station 12 may include the same components as the other stations 12, except that the touch screen 32 and the user interface 34 are facing the attendant so that the attendant can enter information about the visitor. The temperature scanner 20, the badge scanner 22, and the QR scanner 24 may be accessible to the visitor. At the attended station 12, the visitor is instructed to scan his driver's license or other ID and a third ID data is received from the badge scanner 22.

Referring to step 125, if the visitor does not have an ID, then a photograph of the visitor is taken using the temperature scanner 20. Alternatively, the photograph may be taken with a camera on the touch screen 32 or another camera in electronic communication with the computing device 28.

Referring to step 126, a telephone number of the visitor is received from the touch screen 32. The attendant asks the visitor for his telephone number. The telephone number of the visitor may be used if contact tracing is necessary.

Referring to step 127, the temperature value from the temperature scanner 20 is received. The temperature scanner 20 outputs the temperature value and may display the temperature value on its display 30 along with an image, either moving or still, of the individual.

Referring to step 128, if the temperature value is above the normal threshold, then a notification is sent to screening failure staff. Also, if the temperature value is above the normal threshold, then the temperature value may be shown on the display 30 with a warning indication, such as being shown in the color red and/or flashing. The visitor may be instructed by the attendant to exit the facility or to proceed to the additional screening room. Either the temperature value or an alert is sent from the computing device 28 to the computer server 14, which receives the temperature value or the alert and transmits a notification which is received by the mobile electronic devices 18 of screening failure staff. The screening failure staff may proceed to the additional screening room or may meet the visitor outside of the facility and may enact a protocol, such as performing additional screening checks, like retaking the visitor's temperature.

Referring to step 129, if the temperature value is within a normal range, then the wellness attestation questions are displayed on the touch screen 32 and the visitor answers to the wellness attestation questions are entered by the attendant. The visitor answers are received from the touch screen 32.

Referring to step 130, if any of the visitor answers is adverse, then a notification to screening failure staff is sent. As with an elevated temperature, the visitor may be instructed by the attendant to exit the facility or to proceed to the additional screening room. An alert is sent from the computing device 28 to the computer server 14, which receives the alert and transmits a notification, such as a text message or an email, which is received by the mobile electronic devices 18 of screening failure staff, including doctors, nurses, technicians, security personnel, etc. The screening failure staff may proceed to the additional screening room or may meet the visitor outside of the facility and may enact a protocol.

Referring to step 131, if no visitor answer is adverse, then patient room information is shown on a display for the attendant only. The display may be the touch screen 32. Referring to FIG. 10, the patient room information may include a name of the patient, a room number, a name of any visitors in the patient's room, a list of visiting times of day, a name of any individuals designated or allowed to visit the patient, a listing of any patient notes, a box to add any patient notes, and the like. Depending on the time of day, the designated visitor list, and the patient notes, the visitor may or may not be allowed to visit the patient he intended to see. For example, if the time of day is outside of the visiting times of day, if the visitor is not one of the designated visitors, or if the patient notes indicate a problem with visiting, then the visitor may not be allowed to visit and may have to leave the facility. Otherwise, the visitor may be allowed to visit.

The attendant may also be shown the screen information of FIG. 11. The information includes listings of allowed numbers of visitors in a plurality of locations of the facility.

Referring to step 132, if the visitor is allowed to visit, then the visitor's information, such as his name, is associated with the room of the patient he is visiting. That is, the visitor's name will appear in the visitor room information discussed in step 131.

Referring to step 133, a label is printed including the third ID data, the photograph, if taken, the patient's room location, and a QR code. The label may be affixed to the visitor's clothing or to a badge that the visitor can wear. Also, an exit link is texted to the visitor's phone number. The visitor clicks on the exit link when he is leaving the facility. The method 100 returns to step 101.

Referring to step 134, if the entrant type is vendor, then a prompt is displayed on the touch screen 32 for the vendor to scan his driver's license or other ID and a fourth ID data is received from the badge scanner 22.

Referring to step 135, a prompt is displayed on the touch screen 32 to enter a telephone number of the vendor and the telephone number is received from the touch screen 32. The telephone number of the vendor may be used if contact tracing is necessary.

Referring to step 136, the temperature value from the temperature scanner 20 is received. The temperature scanner 20 outputs the temperature value and may display the temperature value on its display 30 along with an image, either moving or still, of the individual.

Referring to step 137, if the temperature value is above the normal threshold, then instructions to the vendor are displayed on the touch screen 32 and a notification is sent to screening failure staff. Also, if the temperature value is above the normal threshold, then the temperature value may be shown on the display 30 with a warning indication, such as being shown in the color red and/or flashing. The instructions may tell the vendor to exit the facility or to proceed to an additional screening room or other isolated area. Either the temperature value or an alert is sent from the computing device 28 to the computer server 14, which receives the temperature value or the alert and transmits a notification which is received by the mobile electronic devices 18 of screening failure staff. The screening failure staff may proceed to the additional screening room or may meet the vendor outside of the facility and may enact a protocol, such as performing additional screening checks, like retaking the vendor's temperature.

Referring to step 138, if the temperature value is within a normal range, then the wellness attestation questions are displayed on the touch screen 32 and the vendor answers to the wellness attestation questions are received. The vendor may answer the questions by touching or contacting the touch screen 32. The vendor answers are received from the touch screen 32.

Referring to step 139, if any of the vendor answers is adverse, then instructions to the vendor are displayed on the touch screen 32 and a notification to screening failure staff is sent. The instructions may tell the vendor to exit the facility or to proceed to an additional screening room or other isolated area. An alert is sent from the computing device 28 to the computer server 14, which receives the alert and transmits a notification, such as a text message or an email, which is received by the mobile electronic devices 18 of screening failure staff, including doctors, nurses, technicians, security personnel, etc. The screening failure staff may proceed to the additional screening room or may meet the vendor outside of the facility and may enact a protocol.

Referring to step 140, if no vendor answer is adverse, then a label is printed that includes the fourth ID data or vendor information and the method 100 returns to step 101.

Referring to step 141, if the input is from the badge scanner 22, then receive a fifth ID data from the badge scanner 22. In some instances, an employee may simply insert his badge into the badge scanner 22 without touching the touch screen 32 first.

Referring to step 142, the fifth ID data is compared with employee records. The comparison may be performed with employee records stored on the computer server 14, and/or the computer server 14 may access and query the databases of the facility to make the comparison.

Referring to step 143, if the fifth ID data matches with an employee, then a temperature value from the temperature scanner 20 is received. The temperature scanner 20 outputs the temperature value and may display the temperature value on its display 30 along with an image, either moving or still, of the individual.

Referring to step 144, if the temperature value is above a normal threshold, then instructions to the employee are displayed on the touch screen 32 and a notification is sent to screening failure staff. Also, if the temperature value is above the normal threshold, then the temperature value may be shown on the display 30 with a warning indication, such as being shown in the color red and/or flashing. The instructions may tell the employee to exit the facility or to proceed to an additional screening room or other isolated area. Either the temperature value or an alert is sent from the computing device 28 to the computer server 14, which receives the temperature value or the alert and transmits a notification, such as a text message or an email, which is received by the mobile electronic devices 18 of screening failure staff, including doctors, nurses, technicians, security personnel, etc. The screening failure staff may proceed to the additional screening room or may meet the employee outside of the facility and may enact a protocol, such as performing additional screening checks, like retaking the employee's temperature. Alternatively, the employee may be allowed to wait for a period of time during which his temperature may decrease and then rescreen himself by repeating steps 141-144.

Referring to step 145, if the temperature value is within a normal range, then the computing device 28 may determine if the employee has already answered the wellness attestation questions via the smartphone app.

Referring to step 146, if the wellness attestation questions have already been answered, then employee answers to the wellness attestation questions are reviewed. The computer server 14 may review the employee answers, or the computer server 14 may transmit the employee answers to the computing device 28 to review them.

Referring to step 147, if the wellness attestation questions have not been answered by the employee through the smartphone app, then the wellness attestation questions are displayed on the touch screen 32 and the employee answers to the wellness attestation questions are received. The wellness attestation questions are the same as discussed in step 108. The employee may answer the questions by touching or contacting the touch screen 32. The employee answers are received from the touch screen 32.

Referring to step 148, if any of the employee answers is adverse, then instructions to the employee are displayed on the touch screen 32 and a notification to screening failure staff is sent. The wellness attestation questions are typically yes/no questions which are formed such that an answer of "yes" to any of the questions indicates having symptoms or having been exposed to a disease or virus and is adverse. The computing device 28 reviews the employee answers and determines if any answer is adverse. Alternatively, the computing device 28 receives an indication from the computer server 14 as to whether any employee answer is adverse. The instructions may tell the employee to exit the facility or to proceed to an additional screening room or other isolated area. An alert is sent from the computing device 28 to the computer server 14, which receives the alert and transmits a notification, such as a text message or an email, which is received by the mobile electronic devices 18 of screening failure staff, including doctors, nurses, technicians, security personnel, etc. The screening failure staff may proceed to the additional screening room or may meet the employee outside of the facility and may enact a protocol.

Referring to step 149, if no employee answer is adverse, then a question is displayed on the touch screen 32 inquiring if the employee needs an item of personal protective equipment (PPE) and a PPE answer is received. The PPE may include a mask (surgical or N95), a gown, gloves, and the like.

Referring to step 150, if the PPE answer is yes, then display a query on the touch screen for the type of PPE and receive and record the type of PPE and a time of issue.

Referring to step 151, if the PPE answer is no, then all data associated with the responses of the employee is recorded on the computer server 14 and the method 100 returns to step 101.

Referring to step 152, if the fifth ID data does not match an employee, then a prompt is displayed on the touch screen 32 for the individual to select another option and the method 100 returns to step 101.

Referring to step 153, if the input is from the QR scanner 24, then the QR code is received from the QR scanner 24. The QR code is typically from a visitor badge. A visitor who is leaving the facility scans his badge before he exits.

Referring to step 154, the computing device 28 sends a notice to the computer server 14 to record that the visitor associated with the QR code has left the facility and the method 100 returns to step 101. The computer server 14 may also record a timestamp for when the QR code was scanned.

Referring to step 155, if the input is from a mobile electronic device 18, then the type of the input is determined. The input may be from the smartphone app or from a text message.

Referring to step 156, if the input is from the smartphone app, then the answers to the wellness attestation questions are associated with the employee whose ID matches the ID data from the smartphone app and the method 100 returns to step 101.

Referring to step 157, if the input is from a text message, then the computing device 28 sends a notice to the computer server 14 to record that the visitor associated with the telephone number has left the facility and the method 100 returns to step 101. The computer server 14 may also record a timestamp for when the QR code was scanned.

In addition to the steps of the method 100 for health screening and access to hospitals and other health provider buildings, the processing element 40 of the computing device 28 and/or the processing element 46 of the computer server 14 also perform the following functions and operations.

Referring to FIG. 12, a portion of a screen is displayed for an employee of the facility to review the current patient listing. The screen lists the name of each patient in the facility along with a patient room number and location. The listing of each patient and location may be presented in a tabular form, wherein each name and location is shown in a cell of a table. The information displayed may be retrieved from the computer server 14 and/or by accessing and querying the databases of the facility.

Referring to FIG. 13, a portion of a screen is displayed for an employee of the facility to review the current patient, visitor, and vendor listing. The screen lists the name, the phone number, a location, a time of day that the individual checked in, a time of day that the individual checked out, and so forth for each patient, visitor, and vendor. The information displayed may be retrieved from the computer server 14 and/or by accessing and querying the databases of the facility.

Referring to FIGS. 14 and 15, a portion of a screen is displayed for an employee of the facility to review supplies or inventory of PPE. As shown in FIG. 14, the screen may show supplies of PPE per department as well as how many items of PPE are checked out. As shown in FIG. 15, the screen may show items of PPE checked out per individual employee. In addition, each screen provides the opportunity for the employee to check out additional items of PPE. The information displayed may be retrieved from the computer server 14 and/or by accessing and querying the databases of the facility.

The processing element 40 of the computing device 28 and/or the processing element 46 of the computer server 14 may further be configured to send a mass text to the mobile electronic device 18 of each individual, including employees, providers, patients, visitors, and vendors, within the facility utilizing the phone number associated with each individual. The processing element 40 of the computing device 28 and/or the processing element 46 of the computer server 14 may also be configured to generate numerous reports on screening activities including numbers of individuals screened based on type of individual (employee, patient, etc.), time of day of screening, date of screening, department of personnel, employee name, rescreening, and so forth.

ADDITIONAL CONSIDERATIONS

Throughout this specification, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current invention can include a variety of combinations and/or integrations of the embodiments described herein.

Although the present application sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as a processing element, may be implemented as special purpose or as general purpose. For example, the processing element may comprise dedicated circuitry or logic that is permanently configured, such as an application-specific integrated circuit (ASIC), or indefinitely configured, such as an FPGA, to perform certain operations. The processing element may also comprise programmable logic or circuitry (e.g., as encompassed within a general-purpose processor or other programmable processor) that is temporarily configured by software to perform certain operations. It will be appreciated that the decision to implement the processing element as special purpose, in dedicated and permanently configured circuitry, or as general purpose (e.g., configured by software) may be driven by cost and time considerations.

Accordingly, the term "processing element" or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the processing element is temporarily configured (e.g., programmed), each of the processing elements need not be configured or instantiated at any one instance in time. For example, where the processing element comprises a general-purpose processor configured using software, the general-purpose processor may be configured as respective different processing elements at different times. Software may accordingly configure the processing element to constitute a particular hardware configuration at one instance of time and to constitute a different hardware configuration at a different instance of time.

Computer hardware components, such as communication elements, memory elements, processing elements, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, at a later time, access the memory device to retrieve and process the stored output. Computer hardware components may also initiate communications with input or output devices, and may operate on a resource (e.g., a collection of information).

The various operations of example methods described herein may be performed, at least partially, by one or more processing elements that are temporarily configured (e.g., by software) or permanently configured to perform the relevant operations. Whether temporarily or permanently configured, such processing elements may constitute processing element-implemented modules that operate to perform one or more operations or functions. The modules referred to herein may, in some example embodiments, comprise processing element-implemented modules.

Similarly, the methods or routines described herein may be at least partially processing element-implemented. For example, at least some of the operations of a method may be performed by one or more processing elements or processing element-implemented hardware modules. The performance of certain of the operations may be distributed among the one or more processing elements, not only residing within a single machine, but deployed across a number of machines. In some example embodiments, the processing elements may be located in a single location (e.g., within a home environment, an office environment or as a server farm), while in other embodiments the processing elements may be distributed across a number of locations.

Unless specifically stated otherwise, discussions herein using words such as "processing," "computing," "calculating," "determining," "presenting," "displaying," or the like may refer to actions or processes of a machine (e.g., a computer with a processing element and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The patent claims at the end of this patent application are not intended to be construed under 35 U.S.C. § 112(f) unless traditional means-plus-function language is expressly recited, such as "means for" or "step for" language being explicitly recited in the claim(s).

Although the technology has been described with reference to the embodiments illustrated in the attached drawing figures, it is noted that equivalents may be employed and substitutions made herein without departing from the scope of the technology as recited in the claims.

Having thus described various embodiments of the technology, what is claimed as new and desired to be protected by Letters Patent includes the following:

1. A system for health screening and access to a facility, the system comprising:
    a computer server including a processing element; and
    a plurality of stations in electronic communication with each other and with the computer server through a communication network, each station including:
        a touch screen configured to display information and receive input, a badge scanner configured to scan identification information of an individual wishing to gain access to the facility,
a temperature scanner configured to measure a body temperature of the individual,
a printer, and
a computing device including a processing element;
wherein the processing element of the computer server and/or the processing element of each computing device are programmed or configured to:
receive input from the touch screen indicating one of a plurality of entrant types, the input being initiated by the individual,
receive identification information from the badge scanner,
receive a temperature value from the temperature scanner,
if the temperature value is above a normal threshold, then send a notification to facility staff,
if the temperature value is within a normal range, then display a plurality of wellness attestation questions on the touch screen and receive a plurality of wellness attestation answers,
if any of the wellness attestation answers is adverse, then send the notification to facility staff,
if no wellness attestation answer is adverse, then if the entrant type is employee, then display a question on the touch screen inquiring if the employee needs an item of personal protective equipment (PPE) and receive a PPE answer, and
if the entrant type is not employee, then print a label that includes the identification information about the individual.

2. The system of claim 1, wherein the processing element of the computer server and/or the processing element of each computing device are further programmed or configured to:
if the PPE answer is yes, then display a query on the touch screen for a type of PPE needed, receive the answer, and record the type of PPE issued to the employee and a time of issue, and
if the PPE answer is no or if the employee received the PPE, then record all data for the wellness attestation answers and the PPE answer associated with the identification information of the employee on the computer server.

3. The system of claim 1, wherein the processing element of the computer server and/or the processing element of each computing device are further programmed or configured to:
if the entrant type is patient, then display a query on the touch screen for a phone number for the patient, receive the phone number, and associate it with identification information about the individual,
display a query on the touch screen for a destination for a service for the patient and receive destination information, and
print the label that includes identification information about the individual and destination information.

4. The system of claim 1, wherein the processing element of the computer server and/or the processing element of each computing device are further programmed or configured to:
if the entrant type is visitor, then receive a phone number for the visitor and associate it with identification information about the individual,
receive a patient room information which the visitor is to visit, and
print the label that includes identification information about the individual, patient room information, and a quick response (QR) code.

5. The system of claim 4, wherein each station further includes a QR scanner configured to scan and receive a QR code, and wherein the processing element of the computer server and/or the processing element of each computing device are further programmed or configured to:
receive the QR code from the QR scanner, and
record that the visitor associated with the QR code has left the facility.

6. The system of claim 4, wherein the processing element of the computer server and/or the processing element of each computing device are further programmed or configured to:
send a text message to the phone number of the visitor, the text message including an exit link, and
receive the exit link when the visitor exits the facility.

7. The system of claim 1, wherein the processing element of the computer server and/or the processing element of each computing device are further programmed or configured to:
if the entrant type is vendor, then display a query on the touch screen for a phone number for the vendor, receive the phone number, and associate it with identification information about the individual.

8. The system of claim 1, wherein the processing element of the computer server and/or the processing element of each computing device are further programmed or configured to:
receive wellness attestation answers from a smartphone app along with identification information associated with one employee of the facility, and
review the wellness attestation answers when the employee utilizes one of the stations to enter the facility.

9. A method for health screening and access to a facility, the method comprising:
receiving input from a touch screen indicating one of a plurality of entrant types, the entrant types comprising at least employee, patient, visitor, and vendor, the input being initiated by an individual wishing to gain access to the facility;
receiving identification information from a badge scanner;
receiving a temperature value from a temperature scanner;
if the temperature value is above a normal threshold, then sending a notification to facility staff;
if the temperature value is within a normal range, then displaying a plurality of wellness attestation questions on the touch screen and receiving a plurality of wellness attestation answers;
if any of the wellness attestation answers is adverse, then sending the notification to facility staff;
if no wellness attestation answer is adverse, then if the entrant type is employee, then displaying a question on the touch screen inquiring if the employee needs an item of personal protective equipment (PPE) and receiving a PPE answer; and
if the entrant type is not employee, then printing a label that includes the identification information about the individual.

10. The method of claim 9, further comprising:
if the PPE answer is yes, then displaying a query on the touch screen for a type of PPE needed, receiving the answer, and recording the type of PPE issued to the employee and a time of issue; and
if the PPE answer is no or if the employee received the PPE, then recording all data for the wellness attestation answers and the PPE answer associated with the identification information of the employee on the computer server.

11. The method of claim 9, further comprising:
if the entrant type is patient, then displaying a query on the touch screen for a phone number for the patient, receiving the phone number, and associating it with identification information about the individual;
displaying a query on the touch screen for a destination for a service for the patient and receiving destination information; and
printing the label that includes identification information about the individual and destination information.

12. The method of claim 9, further comprising:
if the entrant type is visitor, then receiving a phone number for the visitor and associating it with identification information about the individual;
receiving a patient room information which the visitor is to visit; and
printing the label that includes identification information about the individual, patient room information, and a quick response (QR) code.

13. The method of claim 12, further comprising:
receiving the QR code from a QR scanner; and
recording that the visitor associated with the QR code has left the facility.

14. The method of claim 12, further comprising:
sending a text message to the phone number of the visitor, the text message including an exit link; and
receiving the exit link when the visitor exits the facility.

15. The method of claim 9, further comprising:
if the entrant type is vendor, then displaying a query on the touch screen for a phone number for the vendor, receiving the phone number, and associating it with identification information about the individual.

16. The method of claim 9, further comprising:
receiving wellness attestation answers from a smartphone app along with identification information associated with one employee of the facility; and
reviewing the wellness attestation answers when the employee utilizes one of the stations to enter the facility.

17. A method for health screening and access to a facility, the method comprising:
receiving input from a touch screen indicating one of a plurality of entrant types, the entrant types comprising at least employee, patient, visitor, and vendor, the input being initiated by an individual wishing to gain access to the facility;
receiving identification information from a badge scanner;
receiving a temperature value from a temperature scanner;
if the temperature value is above a normal threshold, then sending a notification to facility staff;
if the temperature value is within a normal range, then displaying a plurality of wellness attestation questions on the touch screen and receiving a plurality of wellness attestation answers;
if any of the wellness attestation answers is adverse, then sending the notification to facility staff;
if no wellness attestation answer is adverse, then if the entrant type is employee, then displaying a question on the touch screen inquiring if the employee needs an item of personal protective equipment (PPE) and receiving a PPE answer;
if the PPE answer is yes, then displaying a query on the touch screen for a type of PPE needed, receiving the answer, and recording the type of PPE issued to the employee and a time of issue;
if the PPE answer is no or if the employee received the PPE, then recording all data for the wellness attestation answers and the PPE answer associated with the identification information of the employee on the computer server;
if the entrant type is patient, then displaying a query on the touch screen for a phone number for the patient, receiving the phone number, and associating it with identification information about the individual;
displaying a query on the touch screen for a destination for a service for the patient and receiving destination information;
printing the label that includes identification information about the individual and destination information;
if the entrant type is visitor, then receiving a phone number for the visitor and associating it with identification information about the individual;
receiving a patient room information which the visitor is to visit;
printing the label that includes identification information about the individual, patient room information, and a quick response (QR) code; and
if the entrant type is vendor, then displaying a query on the touch screen for a phone number for the vendor, receiving the phone number, and associating it with identification information about the individual.

18. The method of claim 17, further comprising:
receiving the QR code from a QR scanner; and
recording that the visitor associated with the QR code has left the facility.

19. The method of claim 17, further comprising:
sending a text message to the phone number of the visitor, the text message including an exit link; and
receiving the exit link when the visitor exits the facility.

20. The method of claim 17, further comprising:
receiving wellness attestation answers from a smartphone app along with identification information associated with one employee of the facility; and
reviewing the wellness attestation answers when the employee utilizes one of the stations to enter the facility.

* * * * *